United States Patent
Kato

(10) Patent No.: US 10,024,695 B2
(45) Date of Patent: Jul. 17, 2018

(54) OPTICAL ENCODER COMPRISING AN ORIGIN POINT DETECTION SCALE HAVING AN ORIGIN POINT DETECTION PATTERN

(71) Applicant: MITUTOYO CORPORATION, Kanagawa (JP)

(72) Inventor: Yoshiaki Kato, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 346 days.

(21) Appl. No.: 14/943,309

(22) Filed: Nov. 17, 2015

(65) Prior Publication Data

US 2016/0153812 A1 Jun. 2, 2016

(30) Foreign Application Priority Data

Nov. 28, 2014 (JP) ................................ 2014-240860

(51) Int. Cl.
*G01D 5/347* (2006.01)
*G01D 5/36* (2006.01)

(52) U.S. Cl.
CPC ..... *G01D 5/34715* (2013.01); *G01D 5/34746* (2013.01); *G01D 5/366* (2013.01)

(58) Field of Classification Search
CPC .... G01D 5/347; G01D 5/34715; G01D 5/366; G01D 5/34746; G01D 5/34707;

(Continued)

(56) References Cited

U.S. PATENT DOCUMENTS 6,229,140 B1 * 5/2001 Ishizuka ............. G01D 5/2457
250/231.18
7,289,229 B2   10/2007 Otsuka
(Continued)

FOREIGN PATENT DOCUMENTS

EP   1574826 A1   9/2005
EP   2525195 A2   11/2012
JP   S56-14112 A   2/1981

OTHER PUBLICATIONS

Search Report issued in European Patent Office (EPO) Patent Application No. 15195537.4, dated Apr. 8, 2016.

*Primary Examiner* — Que T Le
*Assistant Examiner* — Jennifer Bennett
(74) *Attorney, Agent, or Firm* — Greenblum & Bernstein, P.L.C.

(57) ABSTRACT

An optical encoder includes an origin point detection scale having an origin point detection pattern and an inverse origin point detection pattern that is the inverse of the origin point detection pattern; a light source emitting light at the origin point detection scale; a light source grid that is inserted on the light source side of the origin point detection scale, the light source grid having two first light source grid patterns corresponding to the origin point detection pattern and the inverse origin point detection pattern, respectively; a photoreceiver detecting a signal from light that has passed through the origin point detection scale; and a photoreceiver grid inserted on the photoreceiver side of the origin point detection scale, the photoreceiver grid having two first photoreceiver grid patterns that are a pattern either identical to or the inverse of the first light source grid pattern.

17 Claims, 26 Drawing Sheets

(58) Field of Classification Search
CPC ........... G01D 5/24428; G01D 5/24433; G01D 5/24438; G01D 5/2457
See application file for complete search history.

(56) References Cited

U.S. PATENT DOCUMENTS

| | | |
|---|---|---|
| 8,481,915 B2 | 7/2013 | Otsuka et al. |
| 8,890,057 B2 | 11/2014 | Hermann |
| 9,207,101 B2 | 12/2015 | Mori et al. |
| 2004/0090637 A1 | 5/2004 | Holzapfel et al. |
| 2008/0067333 A1 | 3/2008 | Holzapfel et al. |
| 2011/0266424 A1 | 11/2011 | Kawatoko et al. |
| 2012/0292493 A1* | 11/2012 | Hermann ............... G01D 5/366 250/231.1 |
| 2015/0276435 A1 | 10/2015 | Mori et al. |

* cited by examiner

OPTICAL ENCODER COMPRISING AN ORIGIN POINT DETECTION SCALE HAVING AN ORIGIN POINT DETECTION PATTERN

CROSS-REFERENCE TO RELATED APPLICATIONS

The present application claims priority under 35 U.S.C. § 119 of Japanese Application No. 2014-240860, filed on Nov. 28, 2014, the disclosure of which is expressly incorporated by reference herein in its entirety.

BACKGROUND OF THE INVENTION

1. Field of the Invention

The present invention relates to an optical encoder.

2. Description of Related Art

An optical encoder detecting a position of a detection head with respect to a scale is widely used for position detection in a measuring apparatus or the like. An incremental-type optical encoder includes a main signal scale detecting a relative position of a detection head, and an origin point detection scale detecting a position of an origin point. By taking the origin point detected by the origin point detection scale as a reference, the incremental-type optical encoder can convert relative position data detected by the main signal scale into absolute position data. Accordingly, the position of the origin point must be detected with a high degree of accuracy in the incremental-type optical encoder.

Japanese Patent Laid-open Publication No. S56-14112 describes an optical encoder using a main scale that includes a first grid portion formed at a predetermined grid pitch; and a second grid portion formed at a grid pitch that is an integer multiple of the first grid portion grid pitch. By superimposing a signal where light that has passed through the first grid portion is received and a signal where light that has passed through the second grid portion is received, the optical encoder described by Japanese Patent Laid-open Publication No. S56-14112 is able to accurately detect an origin point position.

The optical encoder described in Japanese Patent Laid-open Publication No. S56-14112 has a two grid configuration that includes a main scale; a read-out scale (photoreceiver grid) positioned directly above a photoreceiver element; and a light source emitting light at the main scale. The optical encoder having the two grid configuration detects the origin point position when the grids of the main scale and the read-out scale match. In order to correctly detect the origin point position, the main scale, read-out scale, and light source must be positioned with a high degree of accuracy in the optical encoder having the two grid configuration. Therefore, costs for manufacturing a highly accurate optical encoder having a two grid configuration are magnified and become expensive.

In addition, a light source grid having the same grid as the read-out scale can be added to the main scale, read-out scale, and light source described in Japanese Patent Laid-open Publication No. S56-14112 to yield an optical encoder having a three grid configuration. The optical encoder having the three grid configuration detects a position using an interference fringe, and therefore can detect a position with a greater degree of accuracy than the two grid configuration. However, in the optical encoder having the three grid configuration using the main scale described in Japanese Patent Laid-open Publication No. S56-14112, in addition to an interference fringe generated by the first grid portion, an interference fringe generated by the second grid portion also passes through the read-out scale and is detected by the photoreceiver element. Therefore, accuracy in detection of the origin point position may be reduced.

SUMMARY OF THE INVENTION

In order to resolve the above circumstances, the present invention provides an optical encoder that is capable of detecting an origin point position with a high degree of accuracy.

An optical encoder according to the present invention includes: an origin point detection scale having an origin point detection pattern and an inverse origin point detection pattern that is the inverse of the origin point detection pattern; a light source emitting light at the origin point detection scale; a light source grid that is inserted on the light source side of the origin point detection scale, the light source grid having a first light source grid pattern corresponding to each of the origin point detection pattern and the inverse origin point detection pattern; a photoreceiver detecting light from the origin point detection scale; and a photoreceiver grid inserted on the photoreceiver side of the origin point detection scale, the photoreceiver grid having a first photoreceiver grid pattern that is one of a pattern identical to the first light source grid pattern and a pattern that is the inverse of the first light source grid pattern, the first photoreceiver grid pattern also corresponding to the origin point detection pattern and the inverse origin point detection pattern. The origin point detection pattern, the inverse origin point detection pattern, the first light source grid pattern, and the first photoreceiver grid pattern include: a reference grid pattern in which a light emission portion and a light blocking portion are repeatedly formed at a pitch P in a length measurement direction; and a plurality of grid patterns in which the light emission portion and light blocking portion are repeatedly formed at a pitch that is a power of 2 times P in the length measurement direction. In the origin point detection pattern, the inverse origin point detection pattern, the first light source grid pattern, and the first photoreceiver grid pattern, the grid patterns provided at identical positions with respect to the reference grid pattern have equal pitch. In one of the origin point detection pattern and the first light source grid pattern, a boundary between the light emission portion and the light blocking portion is provided at a length measurement direction center of the reference grid pattern and the grid patterns. In the other of the origin point detection pattern and the first light source grid pattern, the light emission portion and the light blocking portion are arranged such that a center of one of the light emission portion and the light blocking portion is positioned at the length measurement direction center of the reference grid pattern and grid patterns.

Moreover, in the present invention, the light emission portion may be a location through which light passes (light transmissive portion) or a location emitting light by reflection (light reflecting portion). The light blocking portion may be a location blocking transmission of light (non-transmissive portion) or a location preventing reflection of light (non-reflecting portion).

According to the present invention, in the origin point detection pattern and the inverse origin point detection pattern, the light emission portion is preferably a light transmissive portion and the light blocking portion is preferably a non-transmissive portion.

According to the present invention, in the origin point detection pattern and the inverse origin point detection pattern, the light emission portion is preferably a light reflecting portion and the light blocking portion is preferably a non-reflecting portion.

According to the present invention, in one of the origin point detection pattern and the first light source grid pattern, the light emission portions and the light blocking portions are preferably arranged symmetrically in the length measurement direction with reference to the length measurement direction center of the reference grid pattern and grid patterns.

According to the present invention, the photoreceiver grid includes the first photoreceiver grid pattern; and a second photoreceiver grid pattern arranged on a plane parallel to a plane of the first photoreceiver grid pattern, the second photoreceiver grid pattern having the light emission portions and light blocking portions in an inverse arrangement with respect to the first photoreceiver grid pattern. Groups are formed in which the first photoreceiver grid pattern and the second photoreceiver grid pattern are arranged so as to be perpendicular to the length measurement direction and aligned in a first direction that is parallel to the plane of the first photoreceiver grid pattern. The photoreceiver is preferably a photoreceiver element array that includes a plurality of first photoreceiver elements having a length equal to a first direction length of the first photoreceiver grid pattern and a plurality of second photoreceiver elements having a length equal to the first direction length of the second photoreceiver grid pattern, the photoreceiver element array having a group where the first photoreceiver elements and the second photoreceiver elements are aligned in the first direction arranged so as to be aligned in the first direction in the same number as the number of groups of the first photoreceiver grid pattern and the second photoreceiver grid pattern.

According to the present invention, in the photoreceiver grid, preferably at least two groups are arranged so as to be aligned in the first direction, the groups having the first photoreceiver grid pattern and the second photoreceiver grid pattern arranged so as to be aligned in the first direction.

According to the present invention, in the origin point detection scale, a group is preferably formed in which the origin point detection pattern and the inverse origin point detection pattern are arranged perpendicular to the length measurement direction and aligned in the first direction, which is parallel to the plane of the first photoreceiver grid pattern.

According to the present invention, in the origin point detection scale, a group is preferably formed in which the origin point detection pattern and the inverse origin point detection pattern are arranged aligned in the first direction.

According to the present invention, in the origin point detection scale, preferably at least two groups are arranged so as to be aligned in the first direction, the groups having the first photoreceiver grid pattern and the second photoreceiver grid pattern arranged so as to be aligned in the first direction.

According to the present invention, the optical encoder preferably includes a first origin point detection scale and a second origin point detection scale as the origin point detection scale, the first origin point detection scale and the second origin point detection scale having the origin point detection pattern and the inverse origin point detection pattern, respectively. The photoreceiver grid preferably includes a first photoreceiver grid corresponding to the first origin point detection scale and a second photoreceiver grid corresponding to the second origin point detection scale. The first photoreceiver grid preferably has the first photoreceiver grid pattern. The second photoreceiver grid preferably has a second photoreceiver grid pattern, in which the light emission portions and the light blocking portions are in an inverse arrangement with respect to the first photoreceiver grid pattern. The photoreceiver preferably includes the first photoreceiver element receiving light emitted from the first origin point detection scale and the first photoreceiver grid; and the second photoreceiver element receiving light emitted from the second origin point detection scale and the second photoreceiver grid.

According to the present invention, the photoreceiver preferably includes a plurality of photoreceiver elements arranged so as to form the photoreceiver grid corresponding to the light source grid, and the plurality of photoreceiver elements are preferably arranged in positions where the light emission portions of the photoreceiver grid are arranged.

According to the present invention, the origin point detection scale preferably has a plurality of origin point detection patterns, and the pitch of the reference grid pattern of each of the plurality of origin point detection patterns differs.

According to the present invention, preferably, the plurality of origin point detection patterns are provided aligned in the length measurement direction and, when the smallest pitch of the reference grid pattern of the plurality of origin point detection patterns is designated $P_1$, an integer of at least 1 is designated n, and a constant is designated a, a pitch $P_n$ of a reference grid pattern having a large pitch at the nth instance is expressed by $P_n = P_1 + (n-1) \times a$.

According to the present invention, preferably, in the origin point detection scale, an integer of at least 1 is designated k, and the constant a is expressed by $a = P_n/3k$.

According to the present invention, preferably, the plurality of origin point detection patterns are provided aligned in the length measurement direction and, when the smallest pitch of the reference grid pattern of the plurality of origin point detection patterns is designated $P_1$, an integer of at least 1 is designated n, and a constant is designated b, a pitch $P_n$ of the reference grid pattern having a large pitch at the nth instance is expressed by $P_n = P_1 \times b^{n-1}$.

According to the present invention, the origin point detection scale is preferably provided aligned with a scale generating a main signal.

An optical encoder according to the present invention includes: an origin point detection scale having an origin point detection pattern and an inverse origin point detection pattern that is the inverse of the origin point detection pattern; a light source emitting light at the origin point detection scale; a light source grid that is inserted on the light source side of the origin point detection scale, the light source grid having a first light source grid pattern corresponding to the origin point detection pattern and the inverse origin point detection pattern; and a photoreceiver detecting light from the origin point detection scale. The origin point detection pattern, the inverse origin point detection pattern, the first light source grid pattern, and the first photoreceiver grid pattern include: a reference grid pattern in which a light emission portion and a light blocking portion are repeatedly formed at a pitch P in a length measurement direction; and a plurality of grid patterns in which the light emission portion and light blocking portion are repeatedly formed at a pitch that is a power of 2 times P in the length measurement direction. In the origin point detection pattern, the inverse origin point detection pattern, the first light source grid pattern, and the first photoreceiver grid pattern, the grid patterns provided at identical positions with respect to the reference grid pattern have equal pitch. In one of the origin point detection pattern and the first light source grid pattern, a boundary between the light emission portion and the light blocking portion is positioned at the length measurement direction center of the reference grid pattern and grid patterns. In the other of the origin point detection pattern and the first light source grid pattern, the light emission portions and the light blocking portions are arranged such that a center of one of the light emission portion and the light blocking portion is positioned at the length measurement direction center of the reference grid pattern and grid patterns. In the origin point detection scale, at least two groups are preferably arranged so as to be aligned in a first direction, which is parallel to a plane of the first photoreceiver grid pattern, the groups having the origin point detection pattern and the inverse origin point detection pattern arranged perpendicular to the length measurement direction of the scale and aligned in the first direction. The photoreceiver includes a first photoreceiver element array in which a plurality of photoreceiver elements having the same shape as the light emission portion of the first light source grid pattern are arranged in positions corresponding to the light emission portions of the first light source grid pattern; and a second photoreceiver element array in which a plurality of photoreceiver elements having the same shape as the light blocking portion of the first light source grid pattern are arranged in positions corresponding to the light blocking portions of the first light source grid pattern.

According to the present invention, an optical encoder can be provided that is capable of detecting an origin point position with a high degree of accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
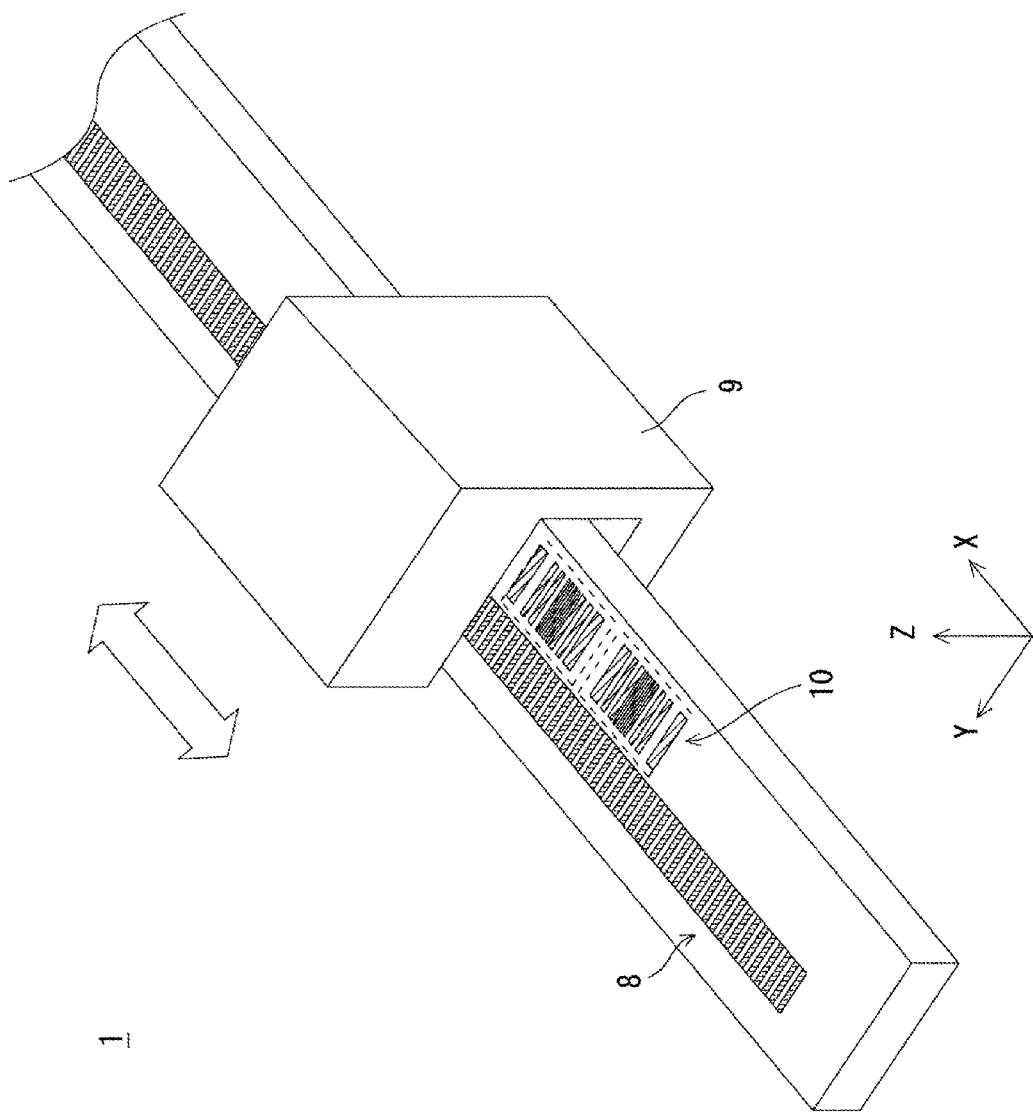
FIG. 1 is a perspective view illustrating an exterior view of an optical encoder according to a first embodiment.

Hereafter, an embodiment of the present invention is described with reference to the drawings. As shown in FIG. 1, an optical encoder 1 according to the present embodiment includes a main signal scale 8, an origin point detection scale 10, and a detection head 9. The detection head 9 displaces relatively along a length measurement direction of the main signal scale 8. A direction in which the detection head 9 displaces with respect to the main signal scale 8 is defined as the length measurement direction. In FIG. 1, the length measurement direction is an X direction. The optical encoder 1 detects an amount of displacement of the detection head 9 with respect to the main signal scale 8.

The main signal scale 8 is a scale generating a main signal. Light transmissive portions and non-transmissive portions are alternatingly arrayed at an equal pitch along the length measurement direction on the main signal scale 8. In FIG. 1, the light transmissive portions are represented by cross-hatching.

Figure 2:
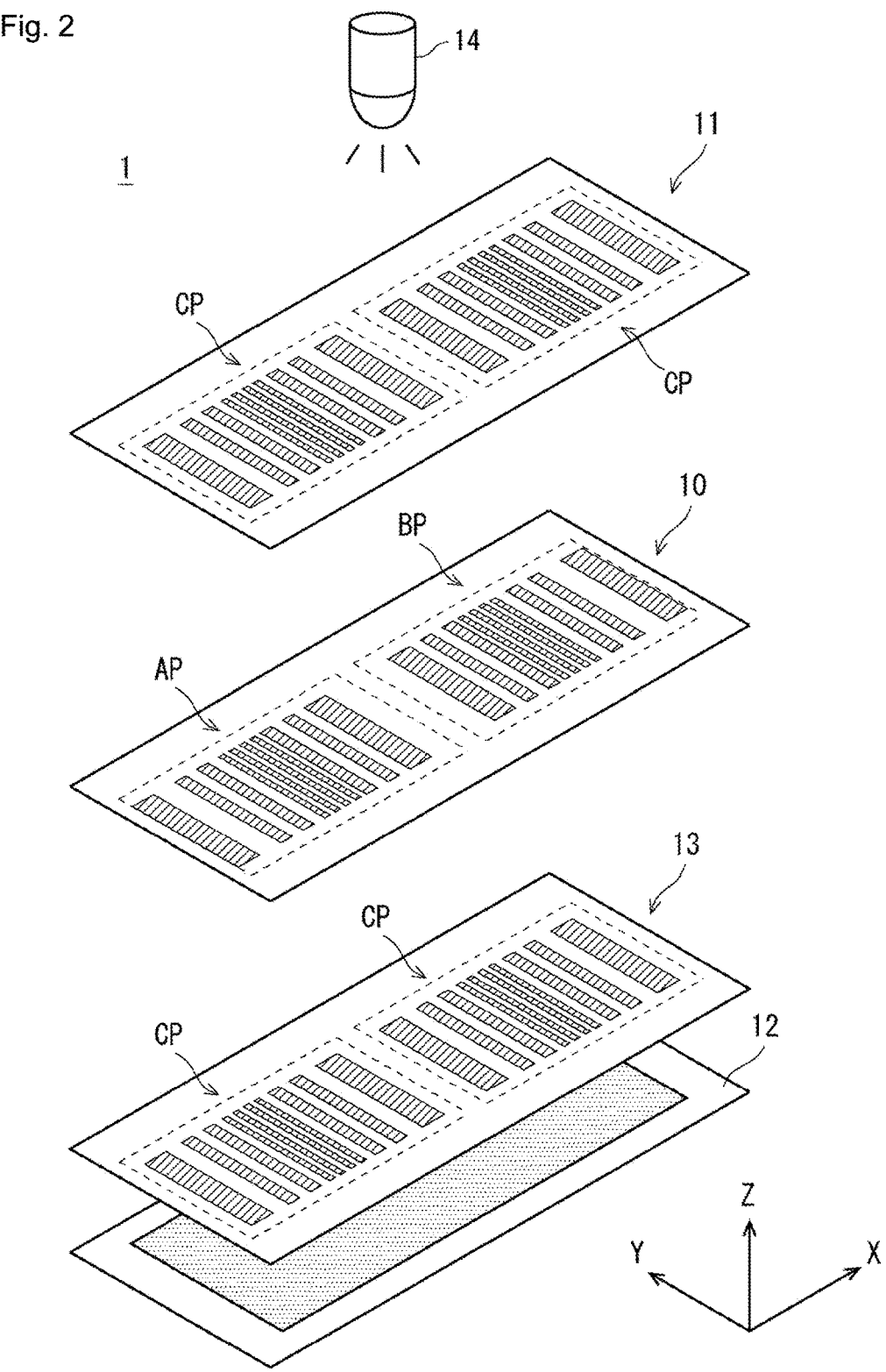
FIG. 2 is a perspective view illustrating a configuration of the optical encoder according to the first embodiment.

FIG. 2 is a perspective view illustrating a configuration of the optical encoder 1. As shown in FIG. 2, the detection head 9 includes a light source 14, a light source grid 11, a photoreceiver element 12, and a photoreceiver grid 13.

The origin point detection scale 10 is provided so as to be aligned with the main signal scale 8 and is a scale generating an origin point signal. The origin point detection scale 10 includes an A pattern AP (origin point detection pattern) and a B pattern BP (inverse origin point detection pattern). The A pattern AP and B pattern BP are arranged so as to be aligned in the length measurement direction.

Figure 3:
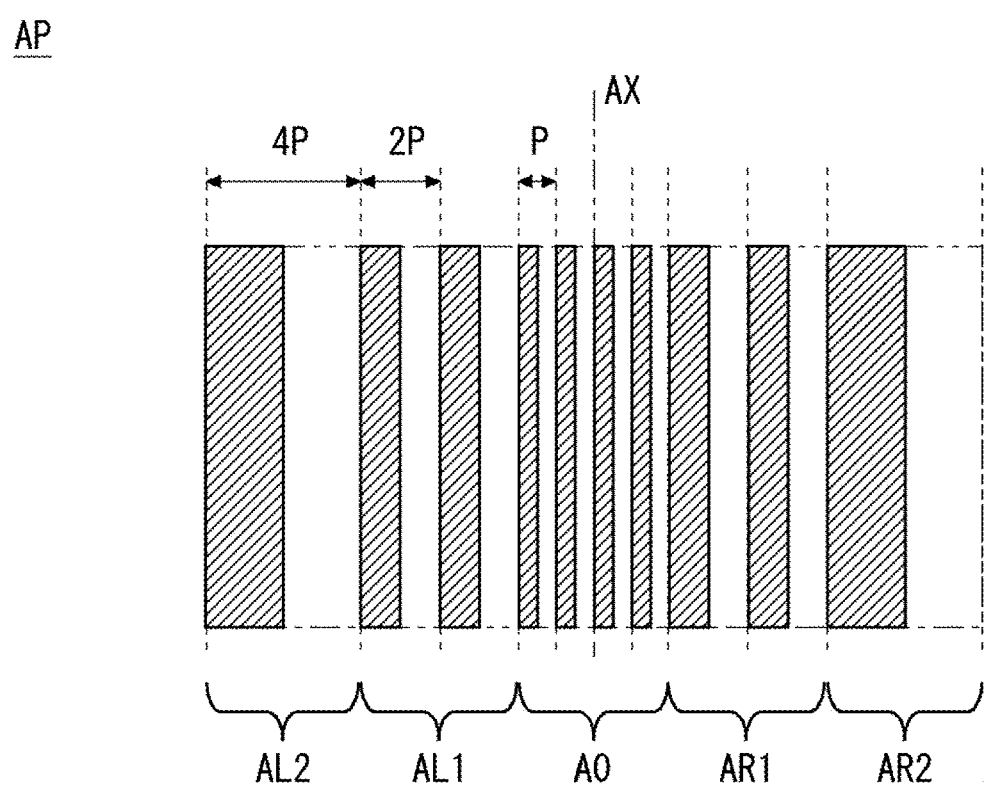
FIG. 3 is a plan view illustrating an arrangement of light transmissive and non-transmissive portions in an A pattern.

As shown in FIG. 3, the A pattern AP includes a reference grid pattern A0 and grid patterns AR1, AR2, AL1, and AL2.

In the reference grid pattern A0, light transmissive portions and non-transmissive portions are alternatingly formed at a pitch P in the length measurement direction. The light transmissive portions are shown in FIG. 3 by cross-hatching. In the reference grid pattern A0, a length measurement direction length of a light transmissive portion is P/2 and a length measurement direction length of a non-transmissive portion is P/2. In this example, the light transmissive portions act as light emission portions emitting light, and the non-transmissive portions act as light blocking portions blocking light.

In the grid patterns AR1, AR2, AL1, and AL2, light transmissive portions and non-transmissive portions are alternatingly formed at a pitch that is a power of 2 times P in the length measurement direction. The grid patterns each differ in pitch. The grid patterns AR1 and AL1 each have two groupings of a light transmissive portion and a non-transmissive portion arrayed at a pitch 2P. In the grid patterns AR1 and AL1, the length measurement direction length of the light transmissive portion is P and the length measurement direction length of the non-transmissive portion is P. The grid patterns AR2 and AL2 each have one grouping of a light transmissive portion and a non-transmissive portion arrayed at a pitch 4P. In the grid patterns AR2 and AL2, the length measurement direction length of the light transmissive portion is 2P and the length measurement direction length of the non-transmissive portion is 2P.

Figure 4:
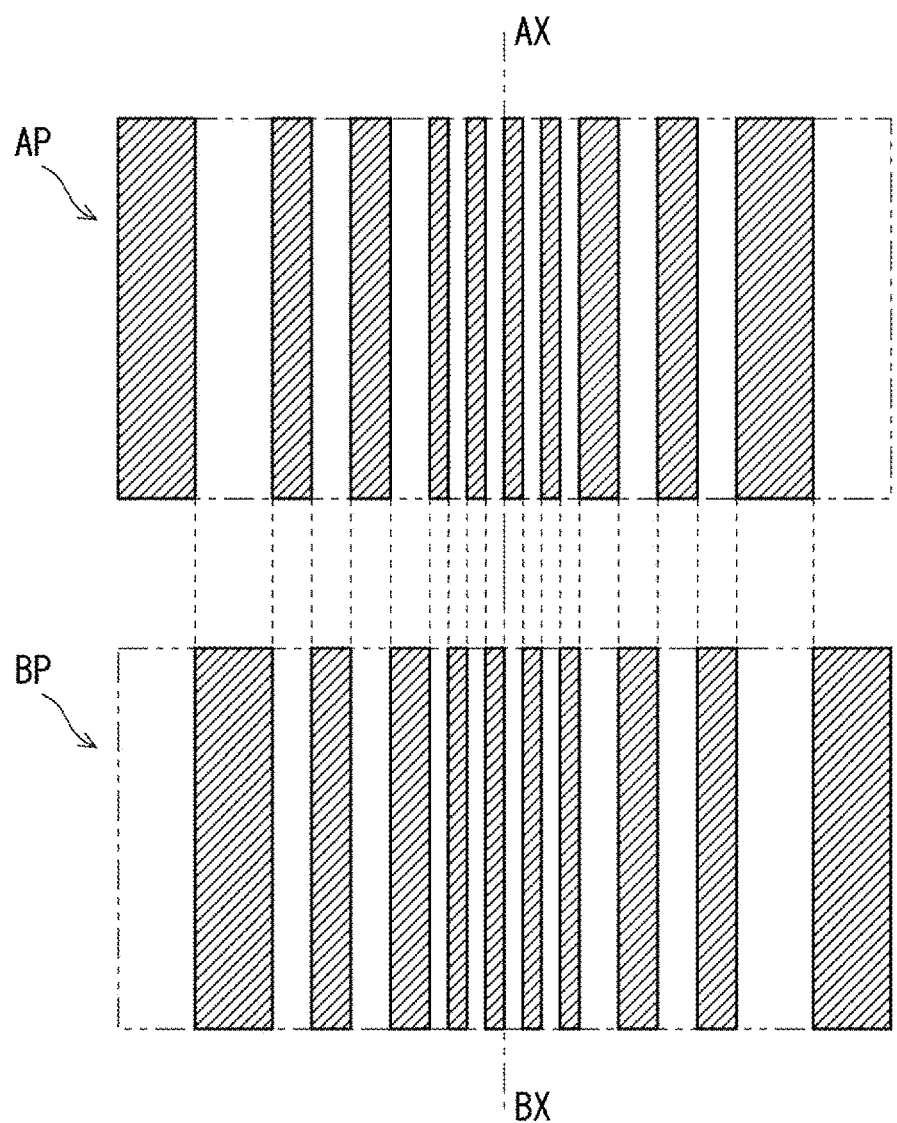
FIG. 4 is a plan view comparing the A pattern with a B pattern.

FIG. 4 illustrates differences in the arrangement of the light transmissive portions and non-transmissive portions in the A pattern AP and B pattern BP. AX is defined as the length measurement direction center of the A pattern AP, whereas BX is defined as the length measurement direction center of the B pattern BP. As shown in FIG. 4, in the B pattern BP, the length measurement direction arrangement of the light transmissive portions and non-transmissive portions is the inverse of the arrangement in the A pattern AP.

As shown in FIG. 2, the light source 14 shines light at the origin point detection scale 10. An LED (Light Emitting Diode), semiconductor laser, SLED (Self-Scanning Light Emitting Device), or OLED (Organic Light Emitting Diode), for example, may be used as the light source 14.

The light source grid 11 is inserted on the light source 14 side of the origin point detection scale 10 (i.e., between the light source 14 and the origin point detection scale 10). The light source grid 11 includes two C patterns CP (first light source grid pattern). The two C patterns CP are arranged so as to be aligned in the length measurement direction.

Figure 5:
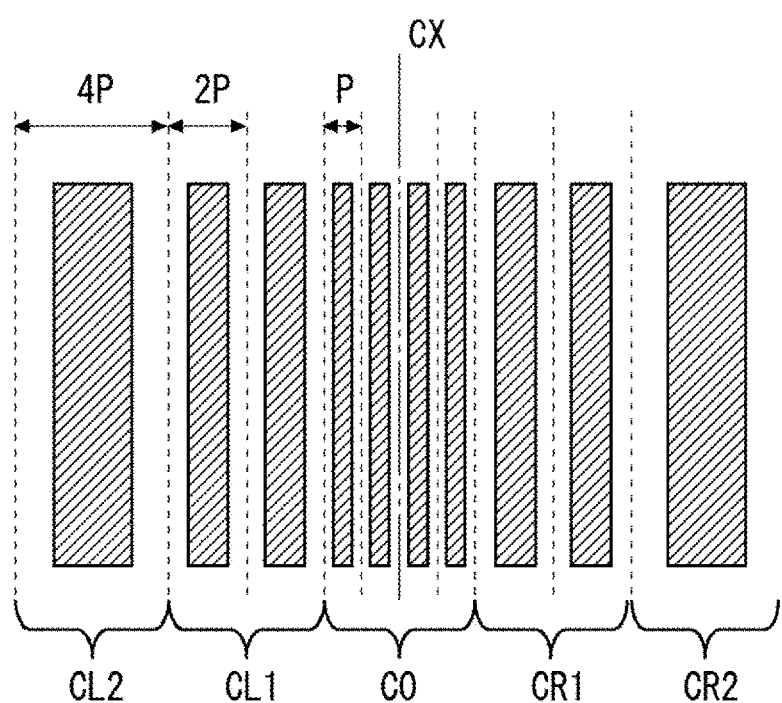
FIG. 5 is a plan view illustrating an arrangement of light transmissive and non-transmissive portions in a C pattern.
Figure 6:
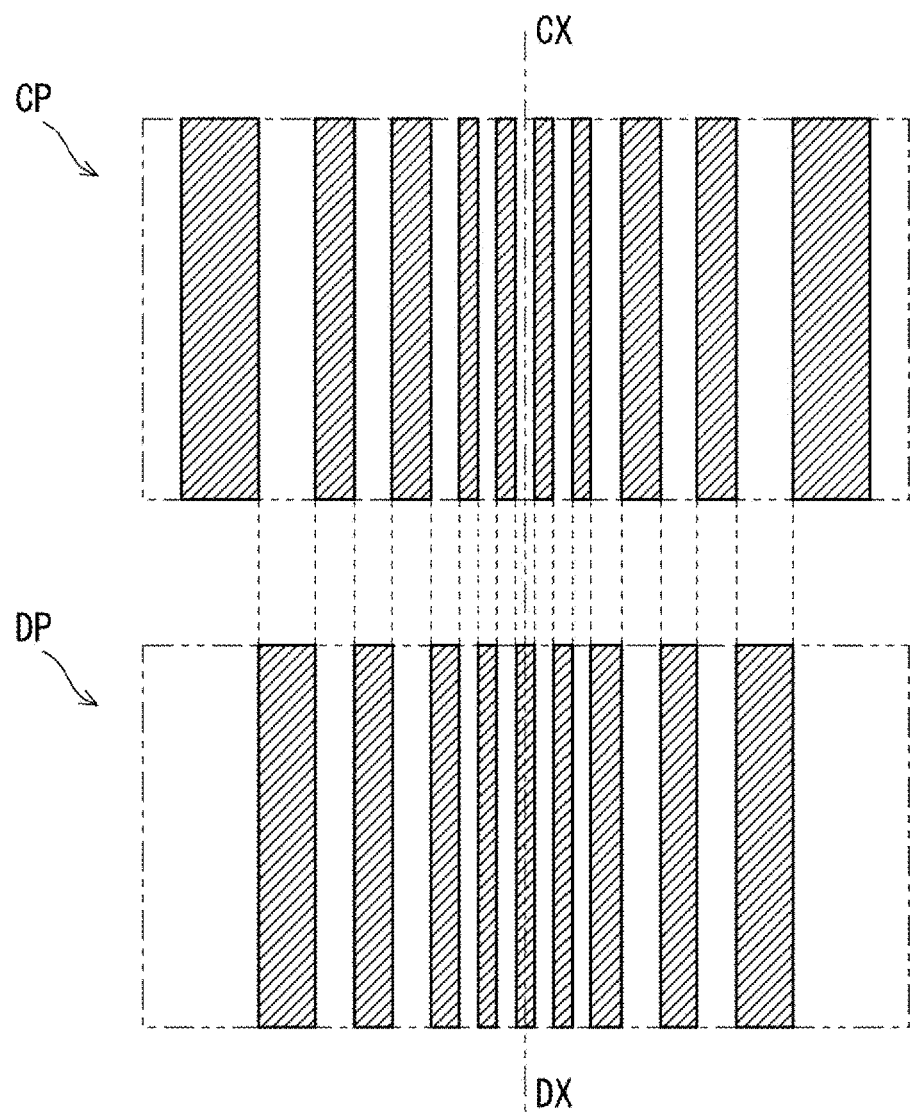
FIG. 6 is a plan view comparing the C pattern with a D pattern.

As shown in FIG. 5, the C pattern CP includes a reference grid pattern C0 and grid patterns CR1, CR2, CL1, and CL2. The C pattern CP may be said to have a grid pattern corresponding to the reference grid pattern A0 and grid patterns AR1, AR2, AL1, and AL2 in the A pattern AP. In addition, as shown in FIG. 6, inverting the light transmissive portions and non-transmissive portions of the C pattern CP yields a D pattern DP. CX is defined as the length measurement direction center of the C pattern CP, whereas DX is defined as the length measurement direction center of the D pattern DP.

As shown in FIGS. 3 and 5, the corresponding grid patterns of the A pattern AP and C pattern CP have identical pitch. Specifically, the pitch of the reference grid patterns A0 and C0 are both P; the pitch of the grid patterns AR1 and AL1 as well as CR1 and CL1 are both 2P; and the pitch of the grid patterns AR2 and AL2 as well as CR2 and CL2 are both 4P.

A boundary between a light transmissive portion and a non-transmissive portion is provided at the length measurement direction center AX of the A pattern AP. In contrast, a center of a non-transmissive portion is positioned at the length measurement direction center CX of the C pattern CP. In other words, the A pattern AP and the C pattern CP are 90° out of phase. Moreover, the center of either a non-transmissive portion or a light transmissive portion may be positioned at the length measurement direction center CX of the grid pattern in the C pattern CP.

Referring back to FIG. 2, the optical encoder 1 is described next. The photoreceiver element 12 detects a signal from light that has passed through the origin point detection scale 10. A photodiode may be used as the photoreceiver element 12, for example.

The photoreceiver grid 13 is arranged on the photoreceiver element 12 side of the origin point detection scale 10 (i.e., between the photoreceiver element 12 and the origin point detection scale 10). The photoreceiver grid 13 includes two C patterns CP (first photoreceiver grid pattern). The two C patterns CP are arranged so as to be aligned in the length measurement direction. Light that has passed through the C pattern CP of the photoreceiver grid 13 strikes the photoreceiver element 12, and an electrical signal is detected by the photoreceiver element 12.

Next, operations of the optical encoder 1 are described with reference to FIGS. 7 to 10. FIGS. 7 to 10 are end views illustrating a cross-section of the optical encoder 1 along an XZ plane. In FIGS. 7 to 10, cross-sections of the non-transmissive portions of the grid patterns are shown by cross-hatching.

Figure 7:
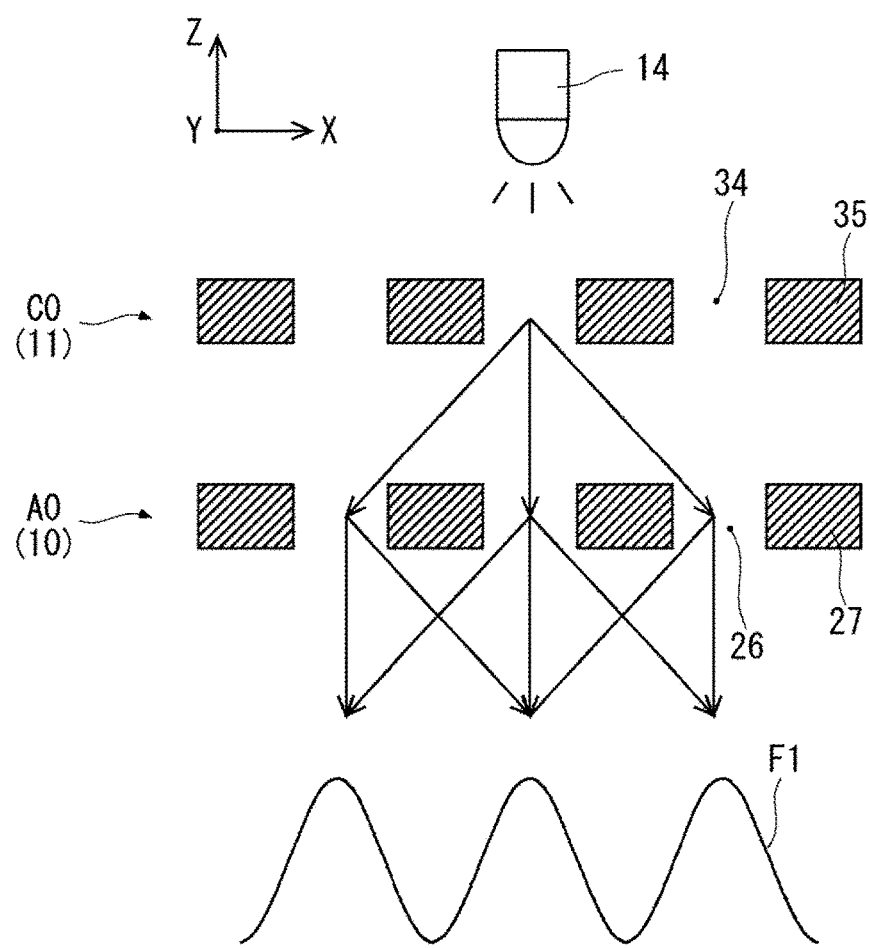
FIG. 7 is an end view illustrating a cross-section along an XZ plane where a reference grid pattern of an origin point detection scale and a reference grid pattern of a light source grid are arranged such that the grids align.
Figure 8:
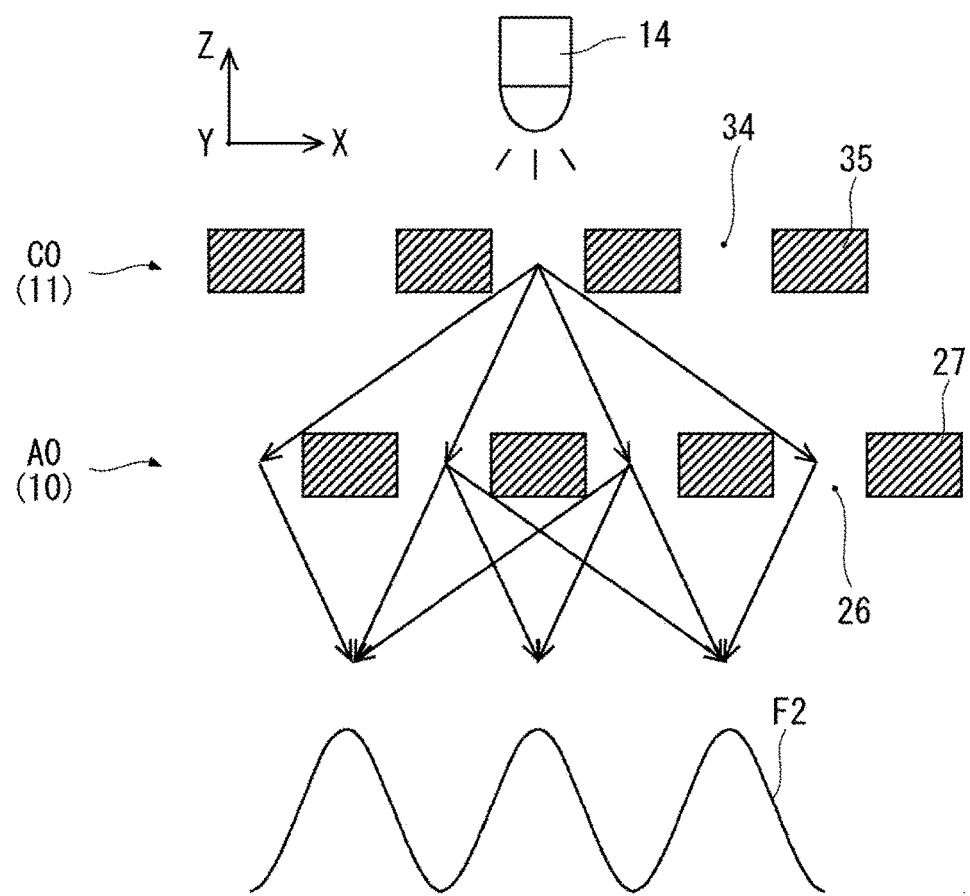
FIG. 8 is an end view illustrating a cross-section along the XZ plane where the reference grid pattern of the origin point detection scale and the reference grid pattern of the light source grid are offset by a half pitch.

First, with reference to FIGS. 7 and 8, a description is given regarding a signal generated when the grid patterns of the origin point detection scale 10, the light source grid 11, and the photoreceiver grid 13 having identical pitch are overlaid on one another. In FIGS. 7 and 8, the reference grid pattern A0 of the A pattern AP in the origin point detection scale 10 and the reference grid pattern C0 of the C pattern CP in the light source grid 11 are shown in isolation.

FIG. 7 is an end view illustrating a cross-section along the XZ plane, which is perpendicular to the origin point detection scale 10, in a case where the reference grid pattern A0 of the origin point detection scale 10 and the reference grid pattern C0 of the light source grid 11 are arranged such that the grids align. FIG. 8 is an end view illustrating a cross-section along the XZ plane, which is perpendicular to the origin point detection scale 10, in a case where the reference grid pattern A0 of the origin point detection scale 10 and the reference grid pattern C0 of the light source grid 11 are offset by a half pitch. As shown in FIG. 7, light emitted from the light source 14 is diffracted when passing through the reference grid pattern C0 of the light source grid 11 and behaves as a plurality of linear light sources arranged in an X-axis direction.

A state where the grids of the reference grid pattern A0 of the origin point detection scale 10 and the reference grid pattern C0 of the light source grid 11 are aligned (i.e., a state where, as shown in FIG. 7, a path exists enabling zero-order light which has passed through a light transmissive portion 34 of the reference grid pattern C0 to pass through a light transmissive portion 26 of the reference grid pattern A0) is designated as a first positional relationship. As shown in FIG. 8, a state where the reference grid pattern A0 of the origin point detection scale 10 and the reference grid pattern C0 of the light source grid 11 are offset by a half pitch (i.e., a state where zero-order light which has passed through the light transmissive portion 34 of the reference grid pattern C0 is blocked by a non-transmissive portion 27 of the reference grid pattern A0) is designated as a second positional relationship.

As shown in FIG. 2, in the origin point detection scale 10, the A pattern AP and B pattern BP are arranged so as to be aligned in the length measurement direction. The corresponding grid patterns of the A pattern AP and the B pattern BP are in a relationship mutually offset by a half period. Therefore, when the A pattern AP is in the first positional relationship with respect to the C pattern CP of the light source grid 11, the B pattern BP necessarily occupies the second positional relationship. Conversely, when the A pattern AP is in the second positional relationship with respect to the light source grid 11, the B pattern BP necessarily occupies the first positional relationship.

An interference fringe generated when the origin point detection scale 10 and the light source grid 11 occupy the first positional relationship is designated as a first interference fringe F1, whereas an interference fringe generated when the origin point detection scale 10 and the light source grid 11 occupy the second positional relationship is designated as a second interference fringe F2. The pitch of the A pattern AP is equal to the pitch of the B pattern BP, and therefore the first interference fringe F1 and the second interference fringe F2 form a coordinate phase interference fringe.

Accordingly, in the optical encoder 1, the length measurement direction phases of the two interference fringes generated by the A pattern AP and the B pattern BP are identical. The photoreceiver grid 13 includes the C pattern CP at positions corresponding to each of the A pattern AP and B pattern BP of the origin point detection scale 10. Therefore, the two interference fringes (first interference fringe F1 and second interference fringe F2) are added together on the photoreceiver element 12, strengthening the signal detected by the photoreceiver element 12.

Figure 9:
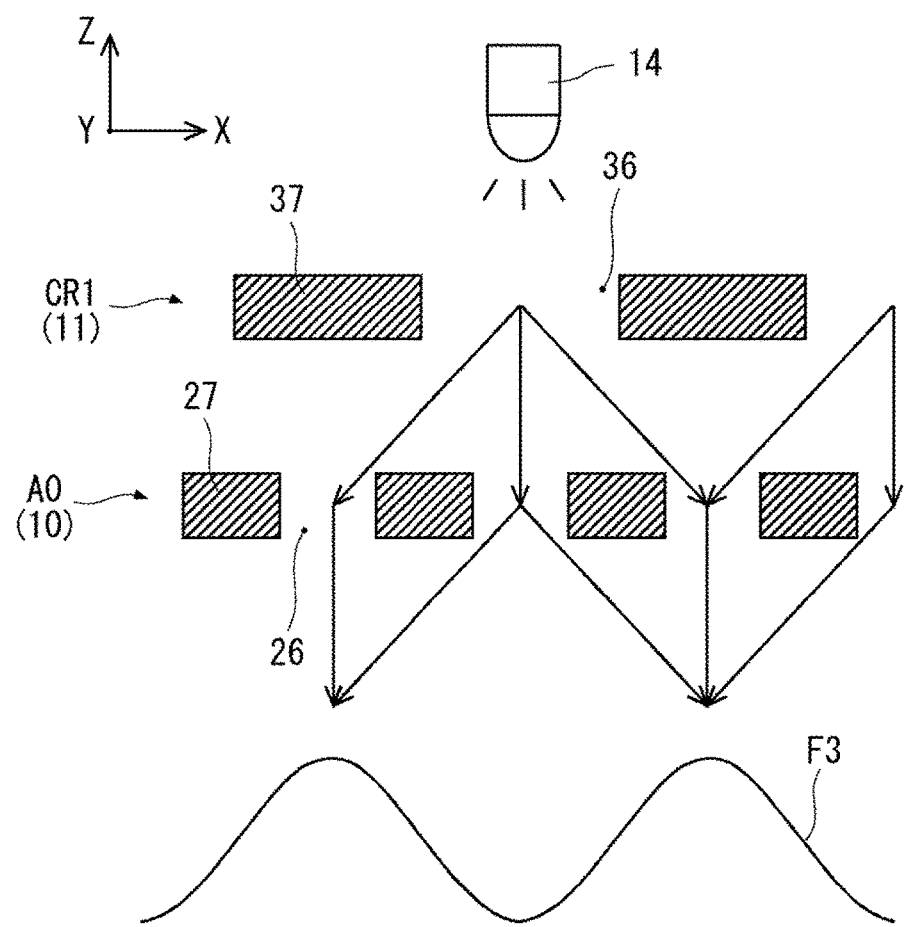
FIG. 9 is an end view illustrating a cross-section along the XZ plane where light transmissive portions of a reference grid pattern of the origin point detection scale are positioned directly below non-transmissive portions of a grid pattern of the light source grid.
Figure 10:
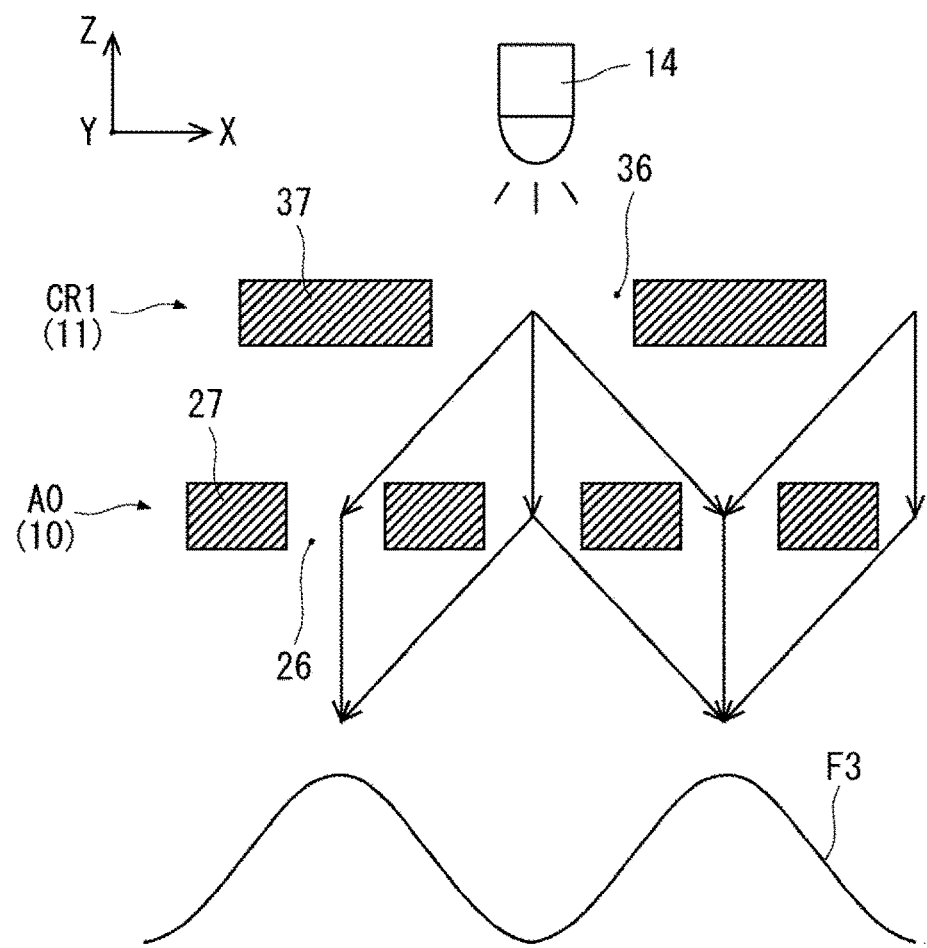
FIG. 10 is an end view illustrating a cross-section along the XZ plane where non-transmissive portions of the reference grid pattern of the origin point detection scale are positioned directly below non-transmissive portions of the grid pattern of the light source grid.

Next, with reference to FIGS. 9 and 10, a description is given of the light that has passed through the grid pattern CR1 of the C pattern CP of the light source grid 11. As shown in FIG. 9, light emitted from the light source 14 is diffracted at the grid pattern CR1 of the light source grid 11 and becomes coherent light. The light that has passed through the light transmissive portion 36 of the grid pattern CR1 of the light source grid 11 strikes the reference grid pattern A0 of the A pattern AP of the origin point detection scale 10.

The pitch of the grid pattern CR1 of the light source grid 11 is 2P, and the pitch of the reference grid pattern A0 of the origin point detection scale 10 is P. Therefore, there are two positional relationships between the grid pattern CR1 of the light source grid 11 and the reference grid pattern A0 of the origin point detection scale 10, as with the positional relationships between the reference grid pattern C0 of the light source grid 11 and the reference grid pattern A0 of the origin point detection scale 10.

In FIG. 9, the light transmissive portions 26 of the reference grid pattern A0 of the origin point detection scale 10 are positioned directly below the non-transmissive portions 36 of the grid pattern CR1 of the light source grid 11. In FIG. 10, the non-transmissive portions 27 of the reference grid pattern A0 of the origin point detection scale 10 are positioned directly below non-transmissive portions 37 of the grid pattern CR1 of the light source grid 11.

The pitch of the grid pattern CR1 of the light source grid 11 is 2P, and the pitch of the reference grid pattern A0 of the origin point detection scale 10 is P. Therefore, the pitch of an interference fringe generated by the grid pattern CR1 and the reference grid pattern A0 is 2P. In FIG. 9, a clear portion of an interference fringe F3 is generated below every other light transmissive portion 26 of the reference grid pattern A0 of the origin point detection scale 10. In contrast, in FIG. 10, the clear portions of an interference fringe F4 are generated below every other non-transmissive portion 27 of the reference grid pattern A0 of the origin point detection scale 10.

When the A pattern AP of the origin point detection scale 10 and the grid pattern CR1 of the light source grid 11 occupy the positions shown in FIG. 9, the B pattern BP of the origin point detection scale 10 and the grid pattern CR1 of the light source grid 11 necessarily occupy the positions shown in FIG. 10. Conversely, when the A pattern AP is in the position shown in FIG. 10, the B pattern BP necessarily occupies the position shown in FIG. 9. Therefore, the interference fringe generated by the A pattern AP and the interference fringe generated by the B pattern BP differ in phase by 180° and therefore weaken each other. Accordingly, light passing through the A pattern AP of the origin point detection scale 10 to strike the photoreceiver element 12 and light passing through the B pattern BP to strike the photoreceiver element 12 cancel each other out.

Figure 11:
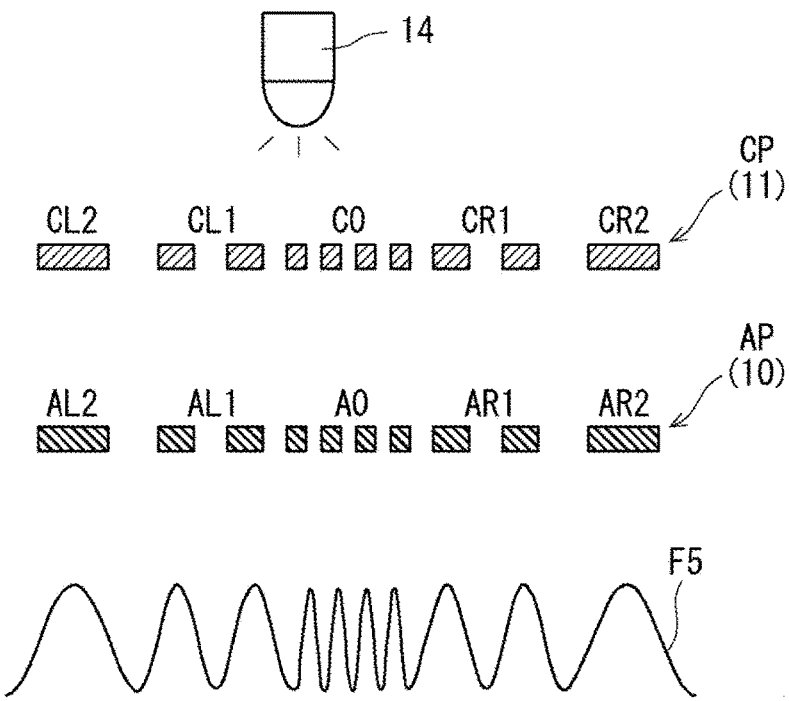
FIG. 11 is an end view illustrating a cross-section along the XZ plane where all of the grids of the A pattern of the origin point detection scale and the C pattern of the light source grid are arranged in a first positional relationship.

As shown in FIG. 11, when all of the grids of the A pattern AP of the origin point detection scale 10 and the C pattern CP of the light source grid 11 are in the first positional relationship, an interference fringe F5 is generated on the photoreceiver element 12 at different pitches corresponding to the different pitches of the grid patterns. At this point, all of the grids of the B pattern BP of the origin point detection scale 10 and the C pattern CP of the light source grid 11 are in the second positional relationship, and therefore an interference fringe having a coordinate phase with the interference fringe F5 is generated on the photoreceiver element 12 by the A pattern AP. Therefore, when in the state shown in FIG. 11, a peak signal intensity is obtained from the photoreceiver element 12.

Figure 12:
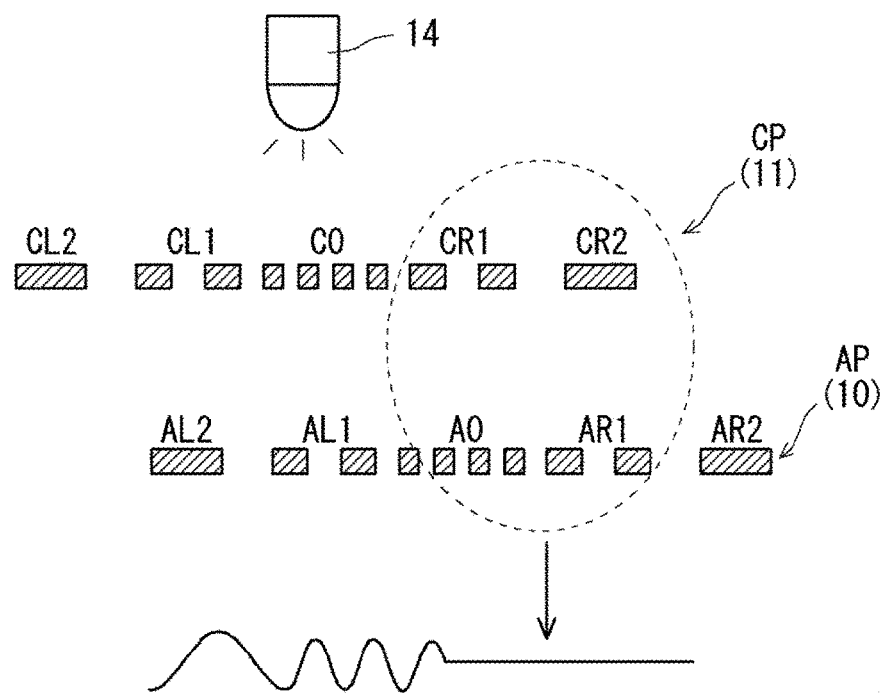
FIG. 12 is an end view illustrating a cross-section along the XZ plane where the A pattern of the origin point detection scale and the C pattern of the light source grid are arranged offset by one grid pattern.

As shown in FIG. 12, a case is postulated in which the A pattern AP of the origin point detection scale 10 and the C pattern CP of the light source grid 11 are offset by one grid pattern. In this case, the grid pattern AL1, rather than the reference grid pattern A0, is positioned directly below the reference grid pattern C0. When the period of the C pattern CP of the light source grid 11 becomes 2N times (where N is a natural number) the period of the A pattern AP of the origin point detection scale 10, the interference fringe generated by the A pattern AP and the interference fringe generated by the B pattern BP are in antiphase, the phases differing by 180°. Therefore, the interference fringes counteract each other on the photoreceiver element 12, weakening the signal intensity.

Figure 13:
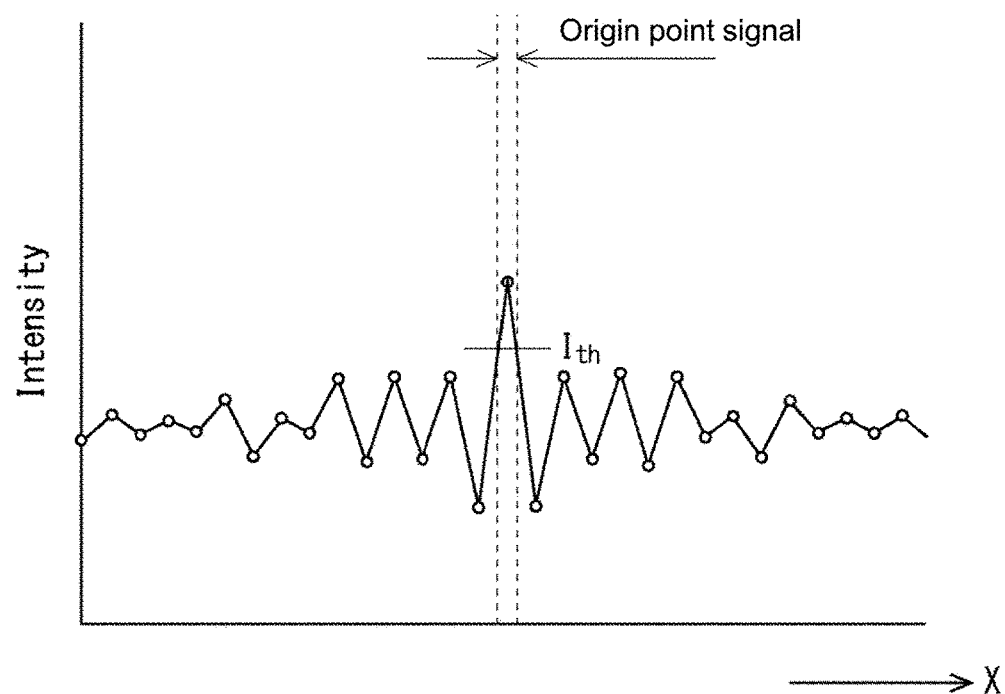
FIG. 13 illustrates a signal from a photoreceiver element of the optical encoder according to the first embodiment.

FIG. 13 depicts changes in the intensity of an origin point signal when the detection head 9 is moved. The horizontal axis represents an amount of displacement of the detection head 9, and the vertical axis represents the intensity of the origin point signal. As shown in FIG. 13, signal intensity increases only in a short interval where the A pattern AP of the origin point detection scale 10 and the C pattern CP of the light source grid 11 match up, and a peak in signal intensity is detected. In other words, a peak in signal intensity is detected when the center AX of the A pattern AP and the center BX of the B pattern BP of the origin point detection scale 10 overlap with the center CX of the C patterns CP of the light source grid 11. In addition, by utilizing a threshold value Ith that intersects with the largest peak but does not intersect with the second largest peak, the origin point signal can be generated.

According to the optical encoder 1, the origin point signal is generated only in a short interval where the A pattern AP and B pattern BP of the origin point detection scale 10 and the C patterns CP of the light source grid 11 match up. Accordingly, an optical encoder can be provided that is capable of detecting an origin point position with a high degree of accuracy.

Moreover, the two grid patterns of the origin point detection scale 10 may be a grouping of grid patterns having phases that differ by 180°, and are not limited to the grouping of the A pattern AP and the B pattern BP. For example, a grouping of the C pattern CP and D pattern DP may be used instead.

Second Embodiment

Figure 14:
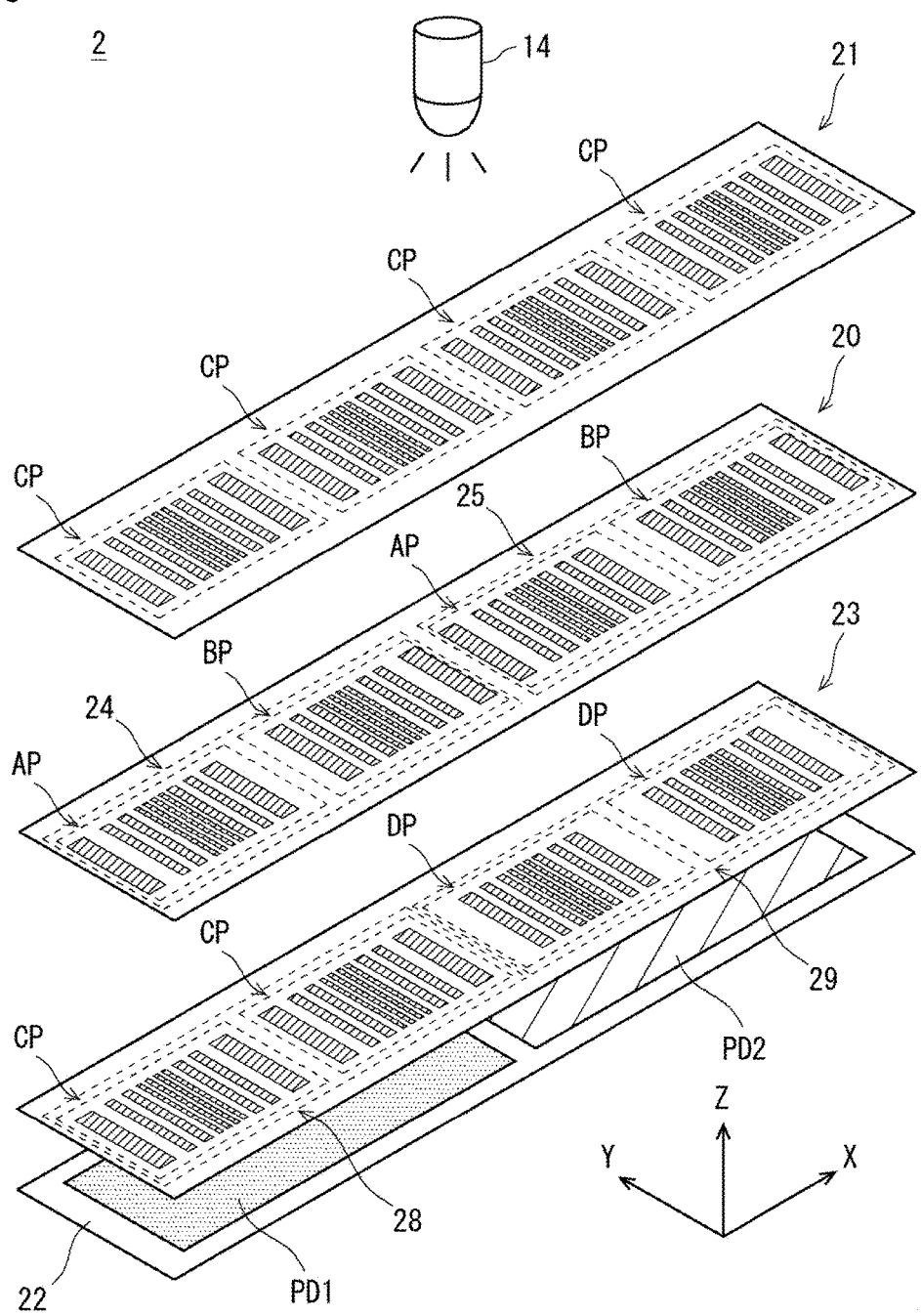
FIG. 14 is a perspective view illustrating a configuration of an optical encoder according to a second embodiment.

As shown in FIG. 14, an optical encoder 2 according to the present embodiment includes an origin point detection scale 20, the light source 14, a light source grid 21, a photoreceiver 22, and a photoreceiver grid 23. The optical encoder 2 differs from the optical encoder 1 according to the first embodiment in that the optical encoder 2 includes two photoreceiver elements PD1 and PD2, and the photoreceiver grid 23 is provided with different patterns corresponding to each photoreceiver element. In each of the second to seventh embodiments, the origin point detection scale and main signal scale are arranged so as to be aligned, as shown in FIG. 1 for the first embodiment, but these are omitted from the drawings.

The origin point detection scale 20 includes a first origin point detection scale 24 and a second origin point detection scale 25. The first origin point detection scale 24 and the second origin point detection scale 25 are arranged so as to be aligned in the length measurement direction (X direction). The first origin point detection scale 24 includes the A pattern AP and B pattern BP, which are arranged so as to be aligned in the length measurement direction. The second origin point detection scale 25 includes the A pattern AP and B pattern BP, which are arranged so as to be aligned in the length measurement direction. The first origin point detection scale 24 and the second origin point detection scale 25 each perform similar operations to those of the origin point detection scale 10 according to the first embodiment.

The light source grid 21 includes four C patterns CP. The C pattern CP is arranged so as to be aligned in the length measurement direction, at positions corresponding to each of the A pattern AP and B pattern BP of the origin point detection scale 20.

The photoreceiver grid 23 includes a first photoreceiver grid 28 corresponding to the first origin point detection scale 24 and a second photoreceiver grid 29 corresponding to the second origin point detection scale 25. The first photoreceiver grid 28 includes two C patterns CP (first photoreceiver grid pattern). The second photoreceiver grid 29 includes two D patterns DP (second photoreceiver grid pattern). In the D pattern DP, the length measurement direction arrangement of the light transmissive portions and non-transmissive portions is the inverse of the arrangement in the C pattern CP. The C patterns CP are arranged so as to be aligned in the length measurement direction, and the D patterns DP are arranged so as to be aligned in the length measurement direction.

The photoreceiver 22 includes the first photoreceiver element PD1 and the second photoreceiver element PD2. The first photoreceiver element PD1 receives light which has passed through the first origin point detection scale 24 and the first photoreceiver grid 28. The second photoreceiver element PD2 receives light which has passed through the second origin point detection scale 25 and the second photoreceiver grid 29.

Figure 15:
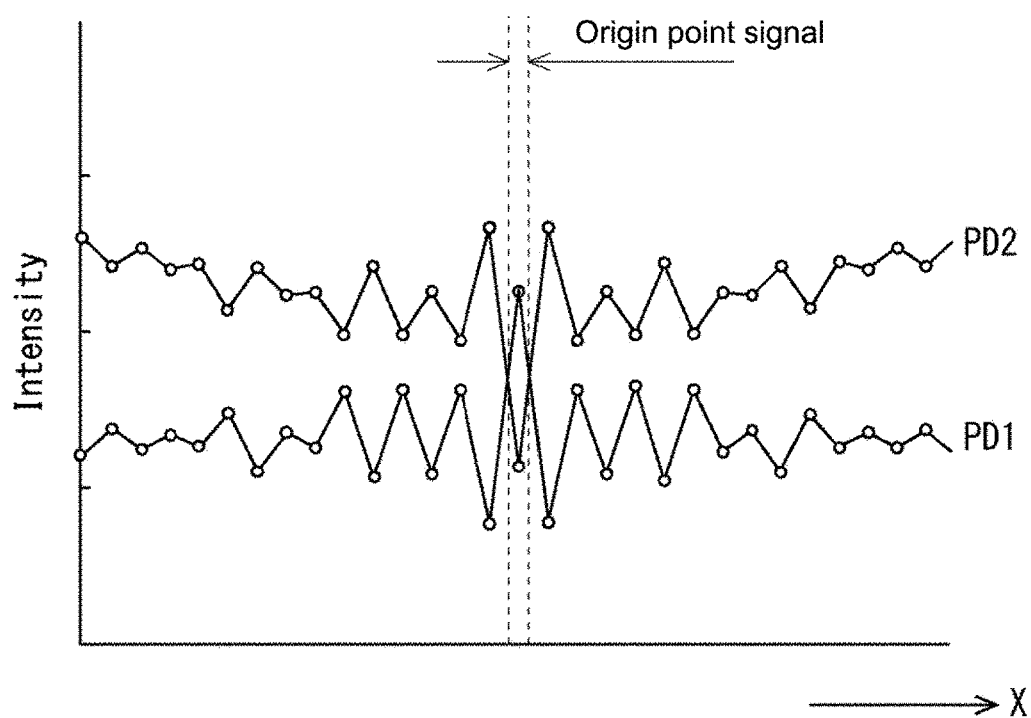
FIG. 15 illustrates a signal from a first photoreceiver element and a signal from a second photoreceiver element.

FIG. 15 illustrates a signal from the first photoreceiver element PD1 and a signal from the second photoreceiver element PD2. As shown in FIG. 15, the signal from the first photoreceiver element PD1 and the signal from the second photoreceiver element PD2 have phases differing by 180°. The signal from the second photoreceiver element PD2 may be referred to as an antiphase signal of the signal from the first photoreceiver element PD1. In the optical encoder 2, a differential signal is obtained for the signal from the first photoreceiver element PD1 and the signal from the second photoreceiver element PD2. As a result, common noise can be counteracted and a peak during origin point detection can be detected clearly.

Third Embodiment

Figure 16:
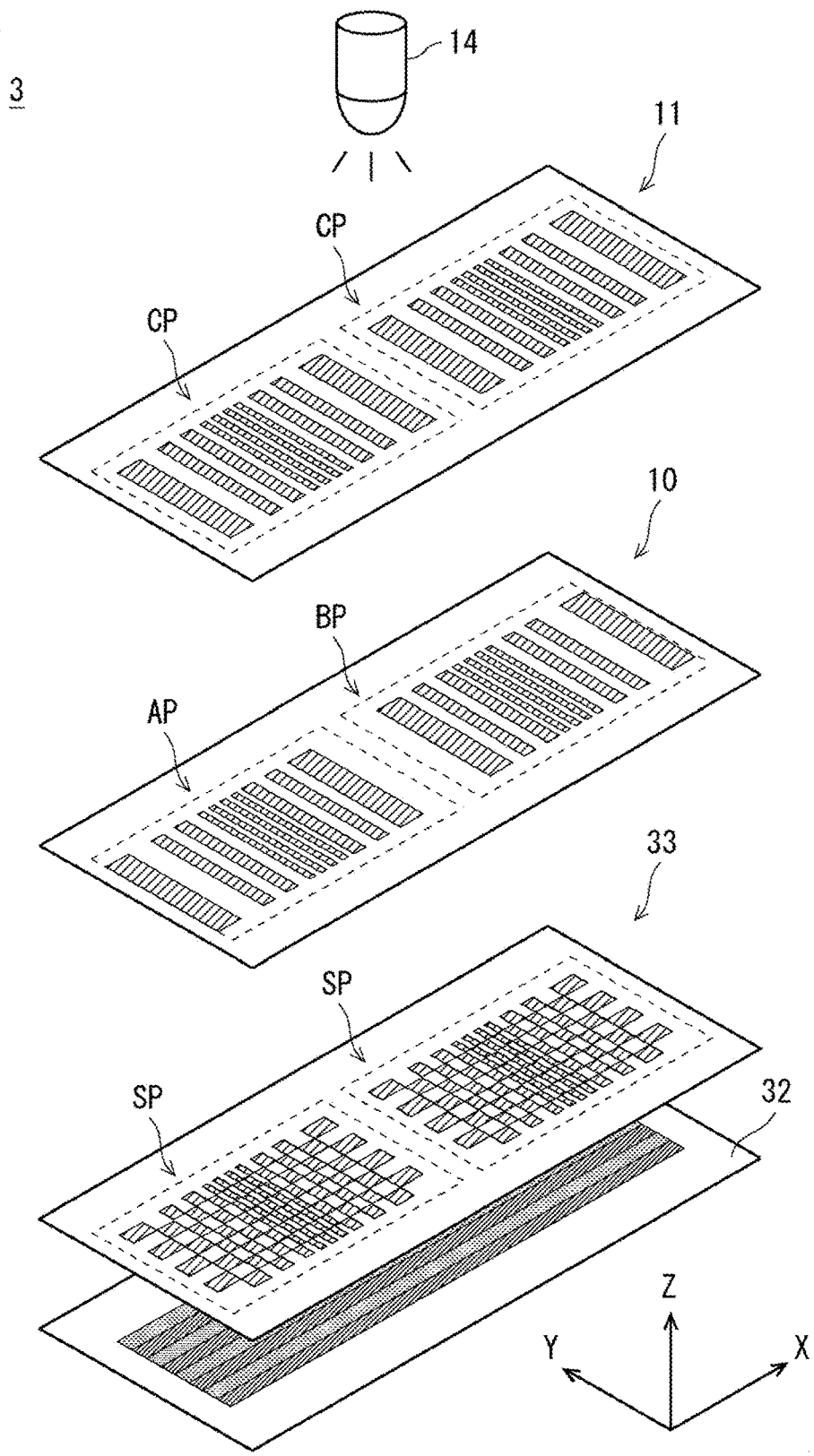
FIG. 16 is a perspective view illustrating a configuration of an optical encoder according to a third embodiment.

As shown in FIG. 16, an optical encoder 3 according to the present embodiment includes the origin point detection scale 10, the light source 14, the light source grid 11, a photoreceiver element array 32, and a photoreceiver grid 33. The optical encoder 3 differs from the optical encoder 1 according to the first embodiment in that the optical encoder 3 includes the photoreceiver grid 33, in which light transmissive portions are arranged in a checkered pattern; and the photoreceiver element array 32, which includes a plurality of photoreceiver elements corresponding in number to the Y direction arrangement of the photoreceiver grid 33.

The photoreceiver grid 33 includes two first checkered patterns SP. The two first checkered patterns SP are arranged so as to be aligned in the length measurement direction, at positions corresponding to the A pattern AP and B pattern BP of the origin point detection scale 10, respectively.

Figure 17:
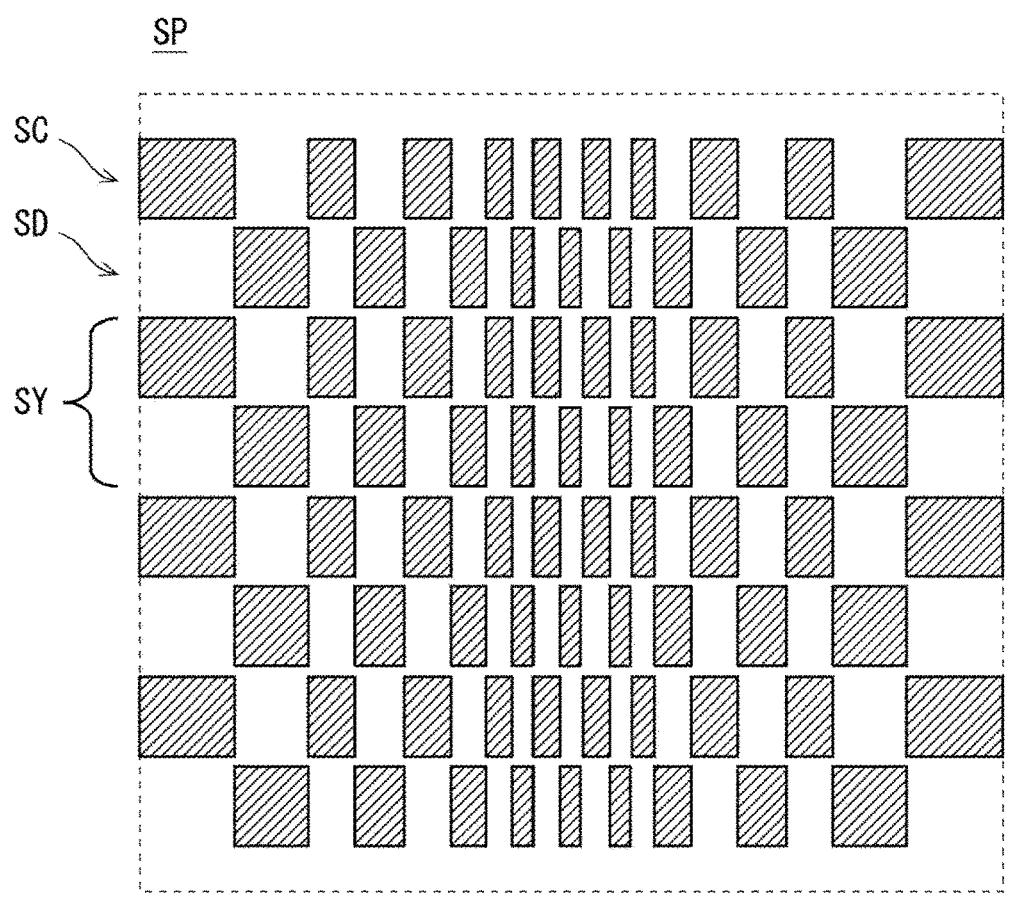
FIG. 17 is a plan view illustrating an arrangement of light transmissive and non-transmissive portions in a first checkered pattern.

As shown in FIG. 17, in the first checkered pattern SP, four C patterns SC (first photoreceiver grid pattern) and four D patterns SD (second photoreceiver grid pattern) are alternatingly arranged in the Y direction. Specifically, the C pattern SC and D pattern SD are perpendicular to the length measurement direction of the scale, and four groupings SY are formed so as to be aligned in the Y direction, the groupings SY being aligned in the Y direction (first direction), which is perpendicular to a Z direction linking the light source 14 and photoreceiver element array 32. In other words, in the first checkered pattern SP, the light transmissive portions have a checkered arrangement. The light transmissive portions of the first checkered pattern SP are shown in FIG. 17 by cross-hatching.

Figure 18:
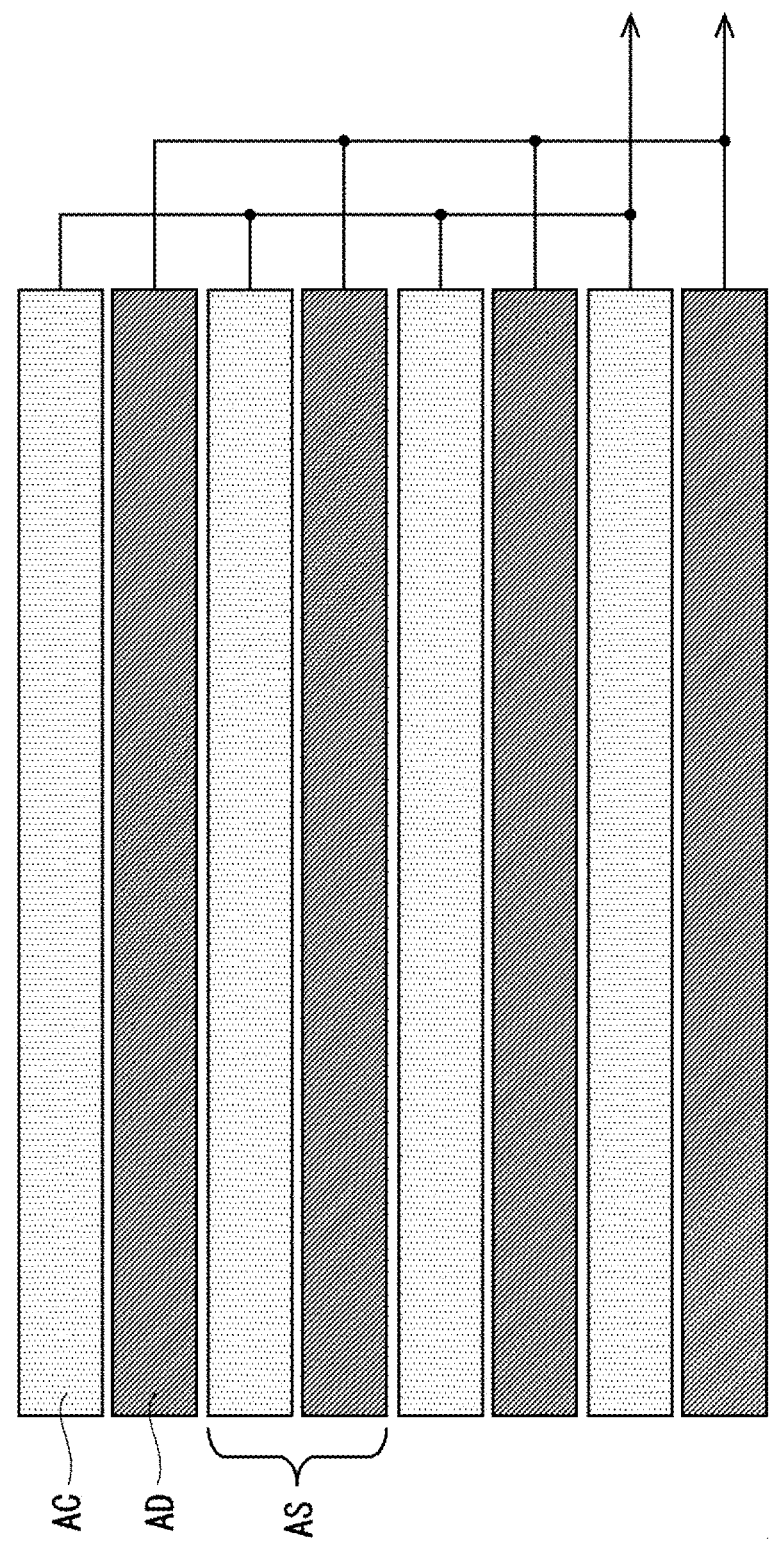
FIG. 18 is a plan view illustrating an arrangement of photoreceiver elements in a photoreceiver element array according to the third embodiment.

As shown in FIG. 18, the photoreceiver element array 32 includes four first photoreceiver elements AC and four second photoreceiver elements AD. In FIG. 18, the first photoreceiver elements AC and the second photoreceiver elements AD are designated by different cross-hatching. A Y-direction length of the first photoreceiver elements AC is equal to the Y-direction length of the C pattern SC of the photoreceiver grid 33. The Y-direction length of the second photoreceiver elements AD is equal to the Y-direction length of the D pattern SD of the photoreceiver grid 33.

Four groupings AS, in which the first photoreceiver elements AC and second photoreceiver elements AD are arranged so as to be aligned in the Y direction, are arranged so as to be aligned in the Y direction, as with the groupings SY of the C patterns SC and D patterns SD of the photoreceiver grid 33. Signals from the four first photoreceiver elements AC are added together and output as one signal, and signals from the four second photoreceiver elements AD are added together and output as another signal.

The optical encoder 3 requires half as much surface area as compared to the origin point detection scale 10, photoreceiver grid 23, and photoreceiver 22 in the optical encoder 2 according to the second embodiment, and therefore the optical encoder 3 is capable of reducing space and reducing the size of the detection head 9.

Fourth Embodiment

Figure 19:
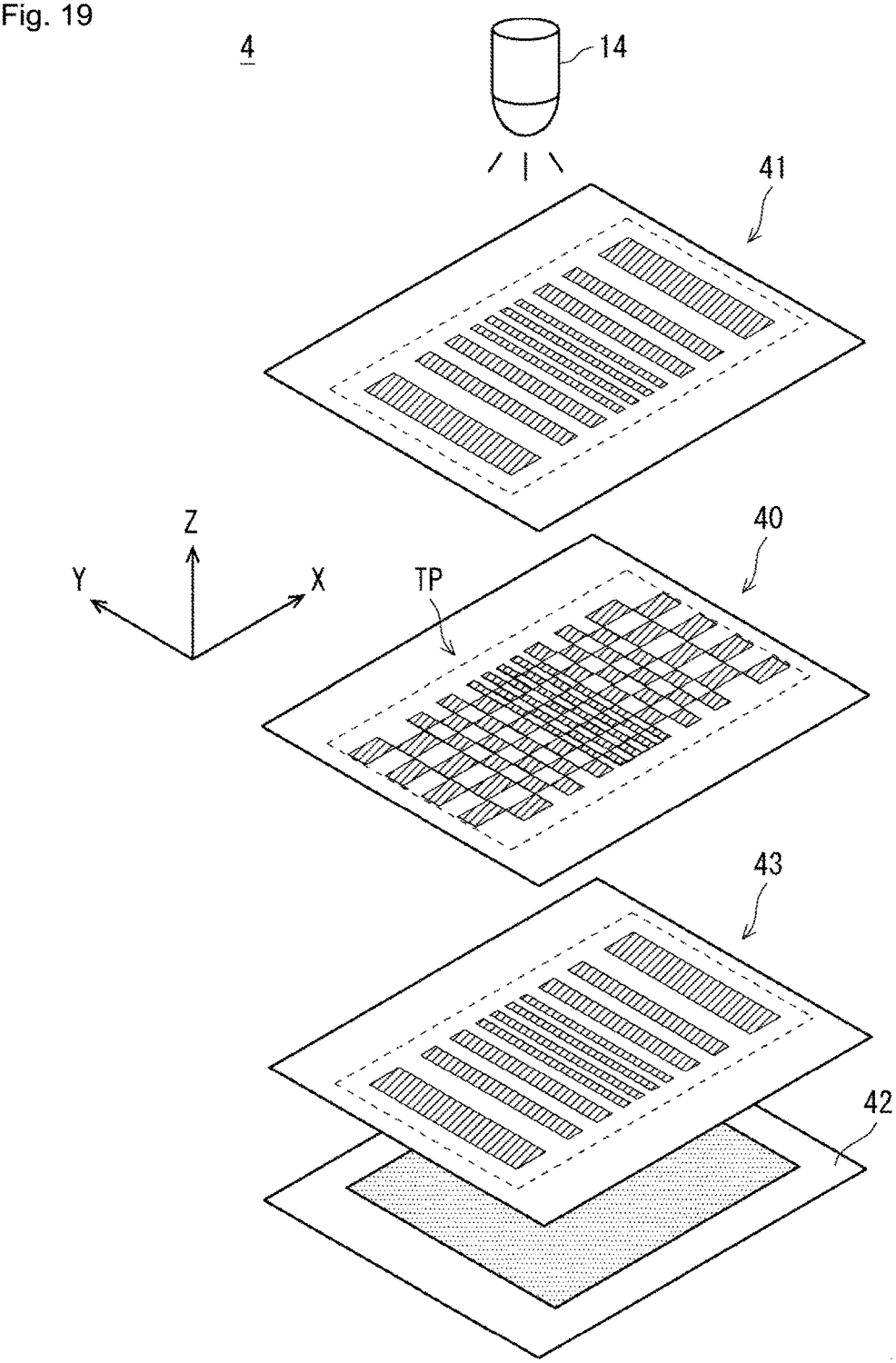
FIG. 19 is a perspective view illustrating a configuration of an optical encoder according to a fourth embodiment.

As shown in FIG. 19, an optical encoder 4 according to the present embodiment includes an origin point detection scale 40, the light source 14, a light source grid 41, a photoreceiver element 42, and a photoreceiver grid 43. The optical encoder 4 differs from the optical encoder 1 according to the first embodiment in that the optical encoder 4 includes the origin point detection scale 40, in which light transmissive portions are arranged in a checkered pattern.

Figure 20:
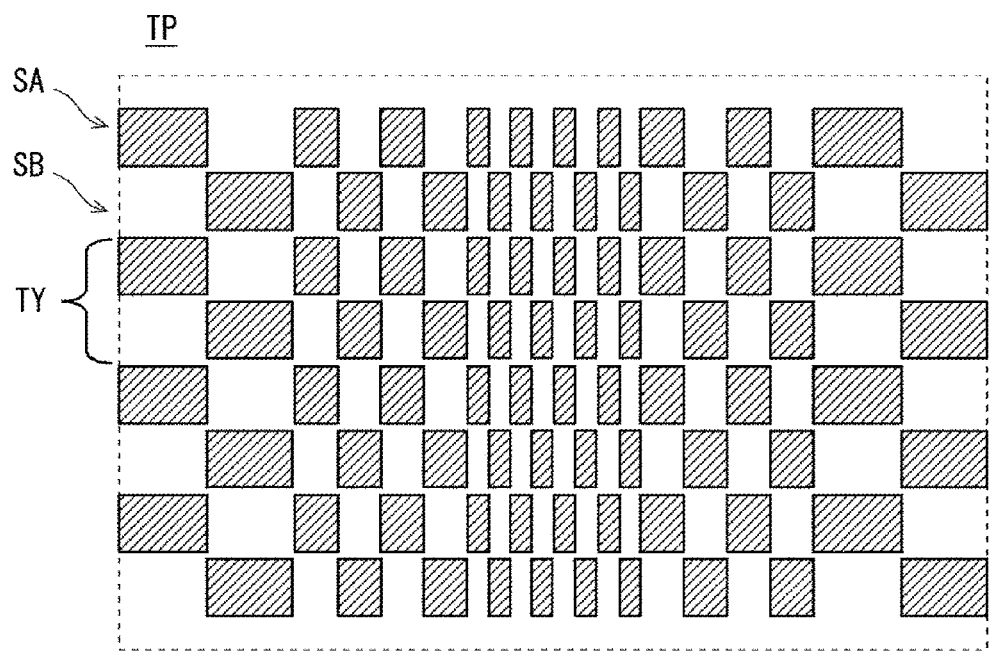
FIG. 20 is a plan view illustrating an arrangement of light transmissive and non-transmissive portions in a second checkered pattern.

The origin point detection scale 40 includes a second checkered pattern TP. As shown in FIG. 20, in the second checkered pattern TP, four A patterns SA (origin point detection pattern) and four B patterns SB (inverse origin point detection pattern) are alternatingly arranged in the Y direction. Specifically, four groupings TY, in which the A pattern SA and B pattern SB are aligned in the Y direction, are formed so as to be aligned in the Y direction. In other words, in the second checkered pattern TP, the light transmissive portions have a checkered arrangement. The light transmissive portions of the second checkered pattern TP are shown in FIG. 20 by cross-hatching.

Like the A pattern AP according to the first embodiment, the A pattern SA includes a reference grid pattern and a plurality of grid patterns. In the B pattern SB, the length measurement direction arrangement of the light transmissive portions and non-transmissive portions is the inverse of the arrangement in the A pattern SA.

The light source grid 41 includes one C pattern CP. Like the light source grid 41, the photoreceiver grid 43 includes one C pattern CP.

The optical encoder 4 requires half as much surface area as compared to the origin point detection scale 10, photoreceiver grid 13, and photoreceiver element 12 in the optical encoder 1 according to the first embodiment, and therefore the optical encoder 4 is capable of reducing space and reducing the size of the detection head 9.

Fifth Embodiment

Figure 21:
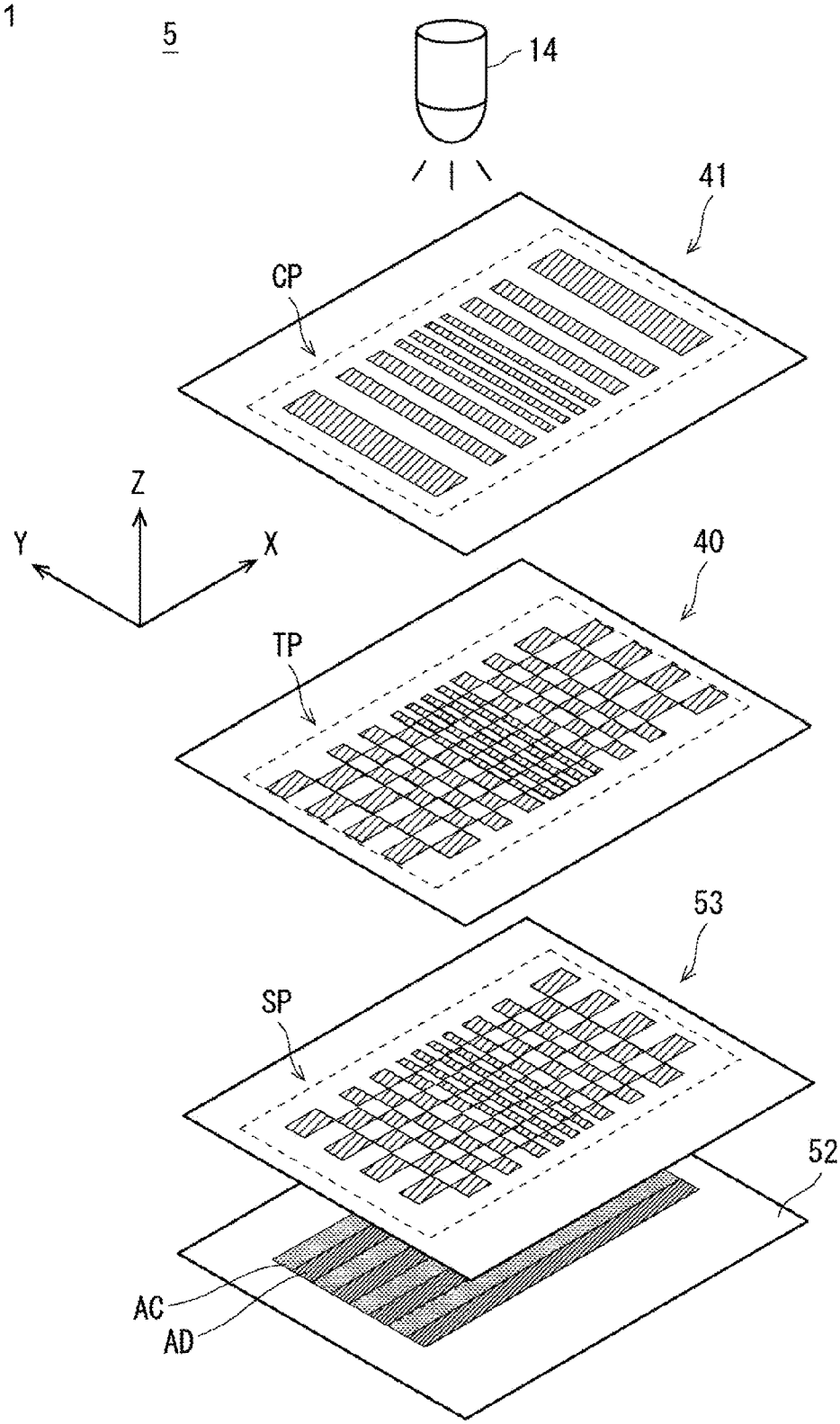
FIG. 21 is a perspective view illustrating a configuration of an optical encoder according to a fifth embodiment.

As shown in FIG. 21, an optical encoder 5 according to the present embodiment includes the origin point detection scale 40, the light source 14, the light source grid 41, a photoreceiver element array 52, and a photoreceiver grid 53. The optical encoder 5 differs from the optical encoder 3 according to the third embodiment in that the optical encoder 5 includes the origin point detection scale 40, in which light transmissive portions are arranged in a checkered pattern; and in that the photoreceiver grid 53 and the photoreceiver element array 52 are reduced in size to match the origin point detection scale 40, the photoreceiver grid 53 having light transmissive portions arranged in a checkered pattern, and the photoreceiver element array 52 including a plurality of photoreceiver elements corresponding in number to a Y direction arrangement of the photoreceiver grid 53.

One second checkered pattern TP is arranged on the origin point detection scale 40. One first checkered pattern SP is arranged on the photoreceiver grid 53. The light source grid 41 includes one C pattern CP.

Similar to the photoreceiver element array 32 according to the third embodiment, the first photoreceiver elements AC and second photoreceiver elements AD are arranged alternatingly in the Y direction on the photoreceiver element array 52. Unlike in the third embodiment, an X direction length of the first photoreceiver elements AC and second photoreceiver elements AD have a length corresponding to one first checkered pattern SP.

Figure 22:
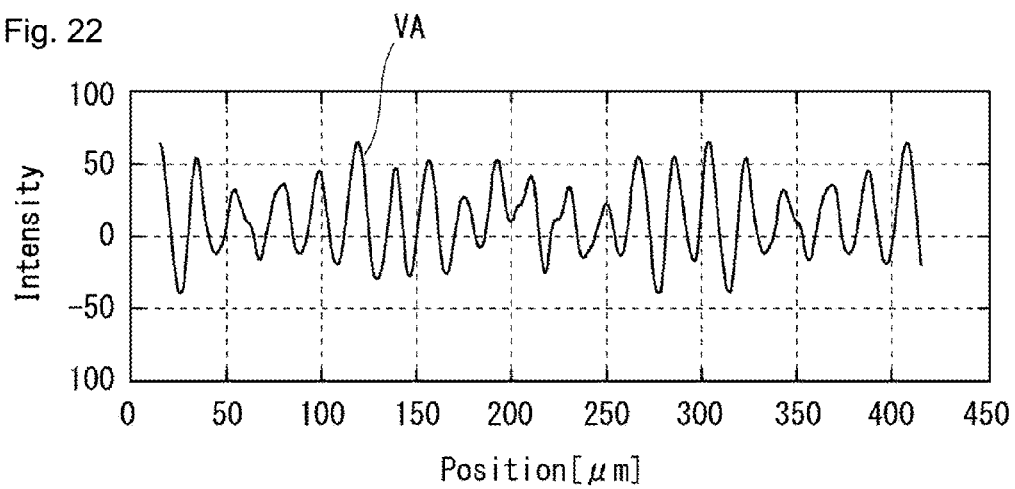
FIG. 22 illustrates intensity of a signal obtained by adding together signals from a plurality of first photoreceiver elements according to the fifth embodiment.
Figure 23:
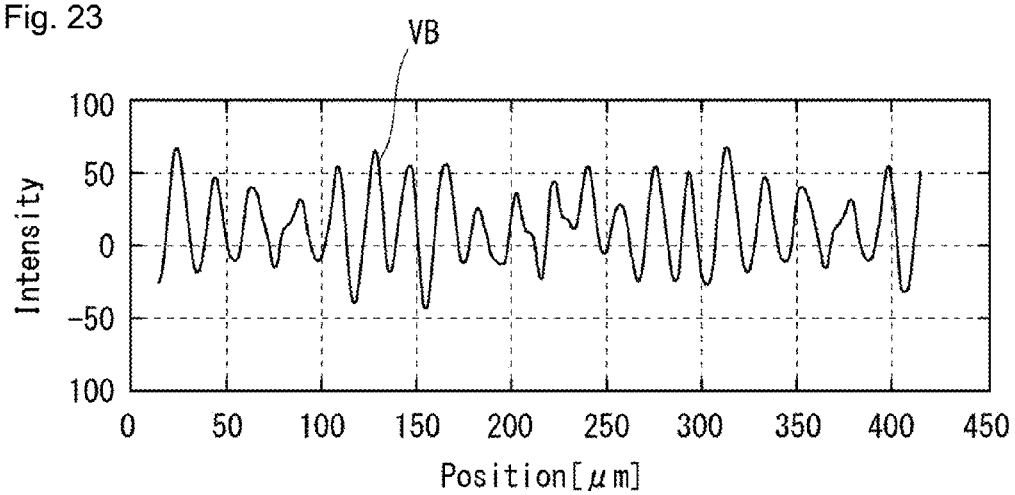
FIG. 23 illustrates intensity of a signal obtained by adding together signals from a plurality of second photoreceiver elements according to the fifth embodiment.
Figure 24:
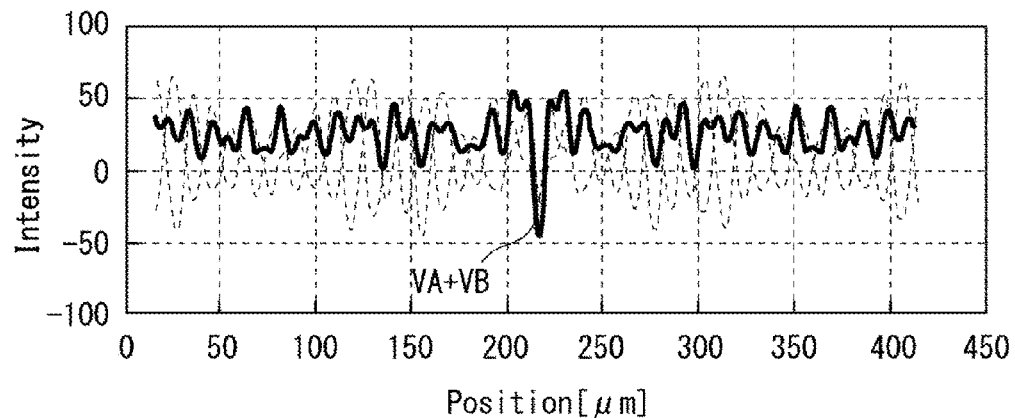
FIG. 24 illustrates intensity of a signal obtained by adding together signals from the plurality of first photoreceiver elements and second photoreceiver elements according to the fifth embodiment.

FIG. 22 depicts a signal VA, in which signals from four first photoreceiver elements AC are added together, and FIG. 23 depicts a signal VB, in which signals from four second photoreceiver elements AD are added together. FIG. 24 depicts a signal VA+VB, in which the signal VA and the signal VB are added together. In FIGS. 22 to 24, the horizontal axis represents a position of the detection head, and the vertical axis represents the signal intensity from the photoreceiver element. In FIG. 24, the signal VA and the signal VB are designated by dashed lines.

As shown in FIGS. 22 and 23, the peak of the origin point is obscured by other peaks in the signal VA and the signal VB. However, as shown in FIG. 24, by taking the sum of the signal VA and the signal VB, an obvious peak appears at the origin point position in the signal VA+VB. Accordingly, the optical encoder 5 can detect the origin point position with a high degree of accuracy.

In addition, the X direction length in the optical encoder 5 is half that of the optical encoder 3 according to the third embodiment. Specifically, the X direction length is ¼ that of the optical encoder 2 according to the second embodiment. Accordingly, space can be reduced. In addition, by reducing the surface area of the light source grid 41, more uniform illumination by the light source 14 is facilitated.

Sixth Embodiment

Figure 25:
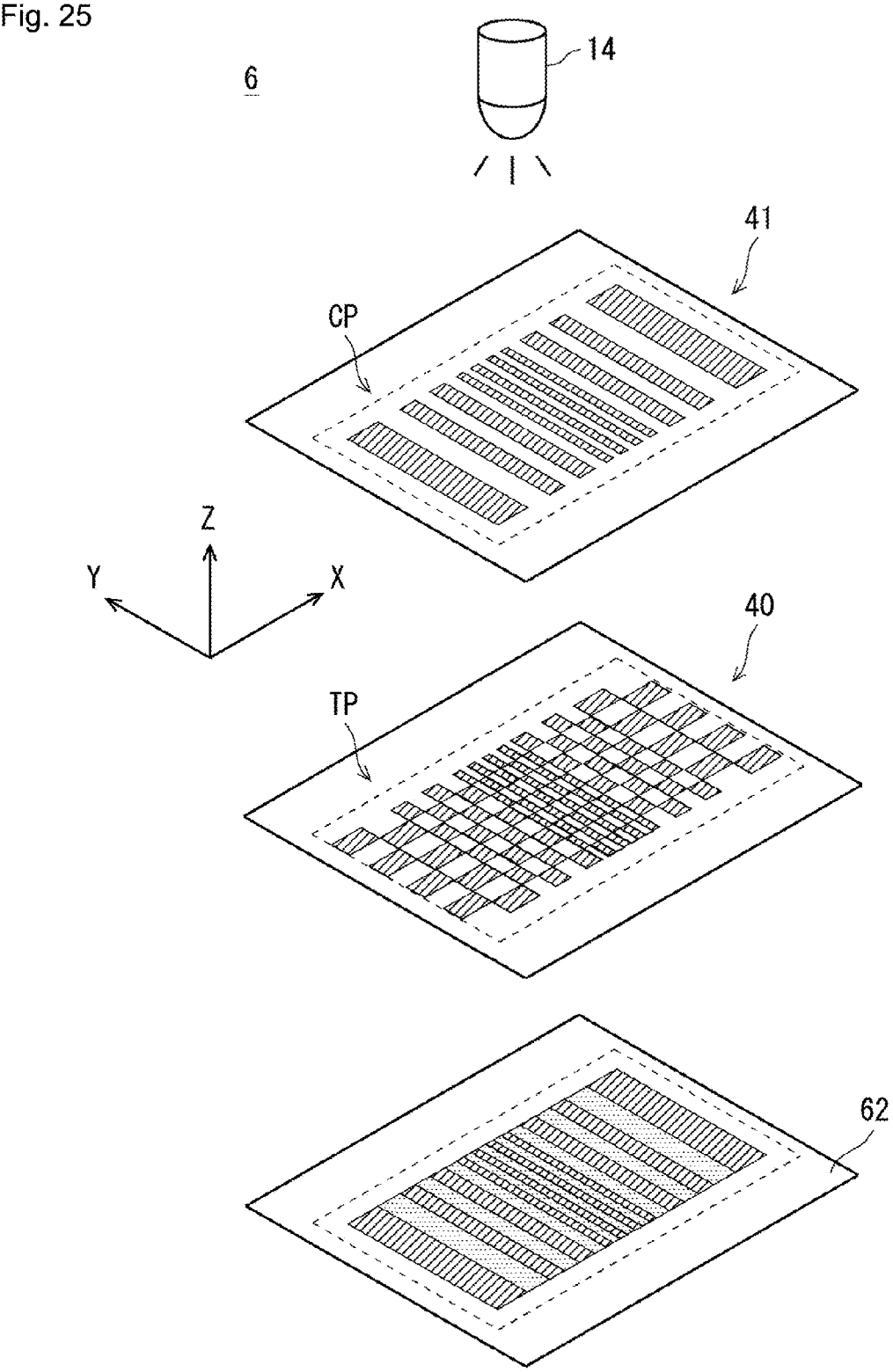
FIG. 25 is a perspective view illustrating a configuration of an optical encoder according to a sixth embodiment.

As shown in FIG. 25, an optical encoder 6 according to the present embodiment includes the origin point detection scale 40, the light source 14, the light source grid 41, and a photoreceiver 62. The optical encoder 6 differs from the optical encoder 5 according to the fifth embodiment in that the optical encoder 6 does not use an array of photoreceiver elements or a photoreceiver grid in the photoreceiver 62.

Figure 26:
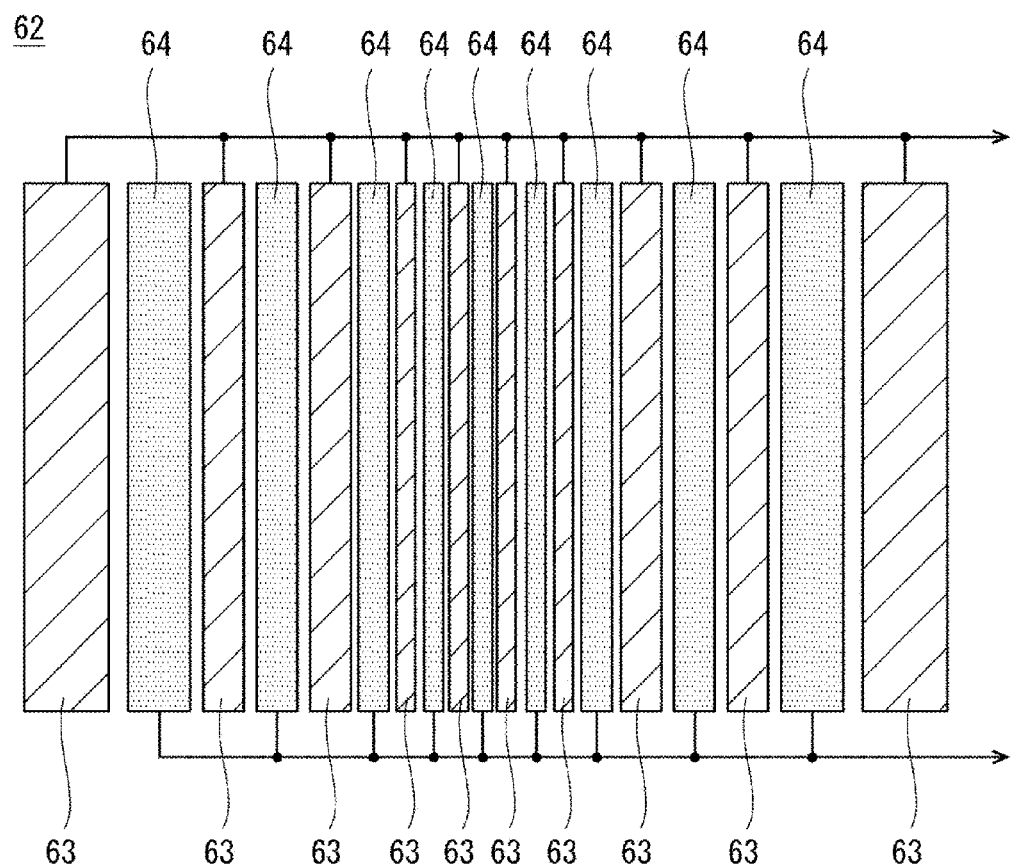
FIG. 26 is a plan view illustrating an arrangement of a first photoreceiver element array and a second photoreceiver element array in a photoreceiver portion according to the sixth embodiment.

As shown in FIG. 26, the photoreceiver 62 includes first photoreceiver element rows 63 and second photoreceiver element rows 64. In the first photoreceiver element row 63, a plurality of photoreceiver elements are arrayed in the length measurement direction at a period identical to that of the C pattern CP of the light source grid 41. In the second photoreceiver element row 64, a plurality of photoreceiver elements are arranged in inverse order from that of the first photoreceiver element row 63. The first photoreceiver element rows 63 and second photoreceiver element rows 64 are alternatingly arranged on the photoreceiver 62.

A signal detected by the first photoreceiver element row 63 has a coordinate phase with the signal detected by the first photoreceiver element AC from the light passing through the light transmissive portions of the C pattern SC of the photoreceiver grid 53 in the optical encoder 5 according to the fifth embodiment. The signal detected by the second photoreceiver element row 64 has a coordinate phase with the signal detected by the second photoreceiver element AD from the light passing through the light transmissive portions of the D pattern SD of the photoreceiver grid 53 in the optical encoder 5 according to the fifth embodiment. Accordingly, the optical encoder 6 according to the present embodiment operates similarly to the optical encoder 5 according to the fifth embodiment.

Unlike the optical encoder 5 according to the fifth embodiment, no light is blocked by the non-transmissive portions of the first checkered pattern SP of the photoreceiver grid 53 in the optical encoder 6. Therefore, a photo-reception area of the photoreceiver element is two times that in the fifth embodiment, and therefore an S/N ratio can be made larger. In addition, no photoreceiver grid is used, and therefore a number of components can be reduced, lowering costs.

Seventh Embodiment

Figure 27:
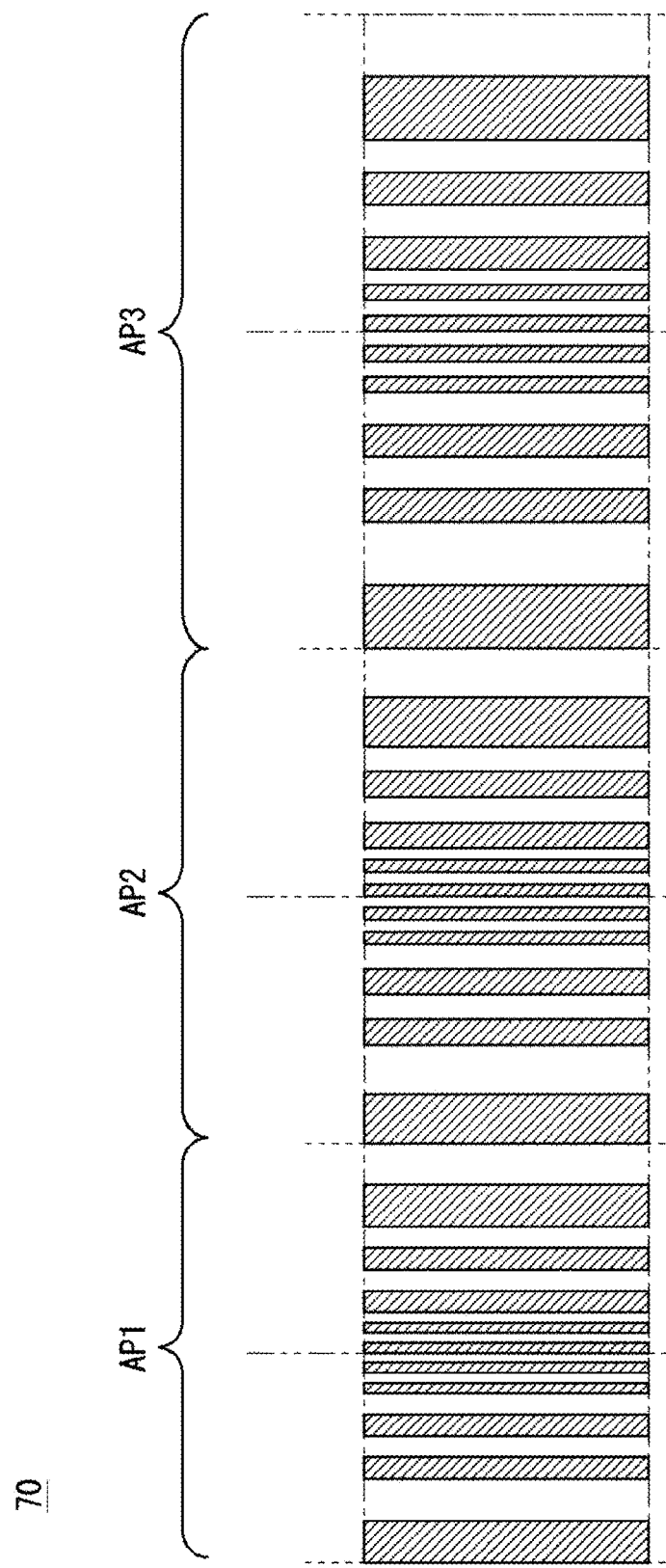
FIG. 27 is a plan view illustrating a configuration of an origin point detection scale according to a seventh embodiment.

As shown in FIG. 27, an origin point detection scale 70 according to the present embodiment includes A patterns AP1 to AP3 instead of the A pattern AP of the origin point detection scale 10 according to the first embodiment. The A patterns AP1 to AP3 are arranged so as to be aligned in the length measurement direction. In an optical encoder according to the present embodiment, a light source grid and photoreceiver grid include a C pattern corresponding to the A patterns AP1 to AP3.

Light transmissive portions and non-transmissive portions are arranged in each of the A patterns AP1 to AP3, as in the A pattern AP according to the first embodiment, and the pitch of a reference grid pattern is different for each of the A patterns AP1 to AP3. The pitch of the reference grid pattern differs in the A patterns AP1 to AP3. Therefore, the pitch of the plurality of grid patterns provided to both length measurement direction sides of the reference grid patterns are also changed to match the pitch of the reference grid pattern.

The A pattern AP1 to AP3 having the smallest reference grid pattern pitch is the A pattern AP1. The pitch of the reference grid pattern of the A pattern AP1 is designated $P_1$, an integer equal to or greater than 1 is designated n, and a constant is designated a. In this scenario, a pitch $P_n$ of the reference grid pattern, which has a large pitch at the nth instance, may be expressed by $P_n = P_1 + (n-1) \times a$.

Moreover, in the A patterns AP1 to AP3 of the origin point detection scale 70, an integer equal to or greater than 1 may also be represented by k, and the constant a may be expressed by $a = P_n/3k$. For example, by defining that $a = P_n/3$ or $a = P_n/6$, noise generated by high order interference can be inhibited.

In addition, the pitch of the reference grid pattern of the A pattern AP1 is designated $P_1$, an integer equal to or greater than 1 is designated n, and a constant is designated b. In this scenario, the pitch $P_n$ of the reference grid pattern, which has a large pitch at the nth instance, may be expressed by $P_n = P_1 \times b^{n-1}$.

In the origin point detection scale 70, the A patterns AP1 to AP3 may be formed such that the pitch of the reference grid pattern changes randomly. Also, the number of A patterns used as origin point detection patterns is not limited to three.

By arranging a plurality of origin point detection patterns in the origin point detection scale 70, peak intensity while detecting the origin point can be made larger, and the S/N ratio can be improved. The number of origin point detection patterns is not limited to three, and may instead be some other number.

Eighth Embodiment

Figure 28:
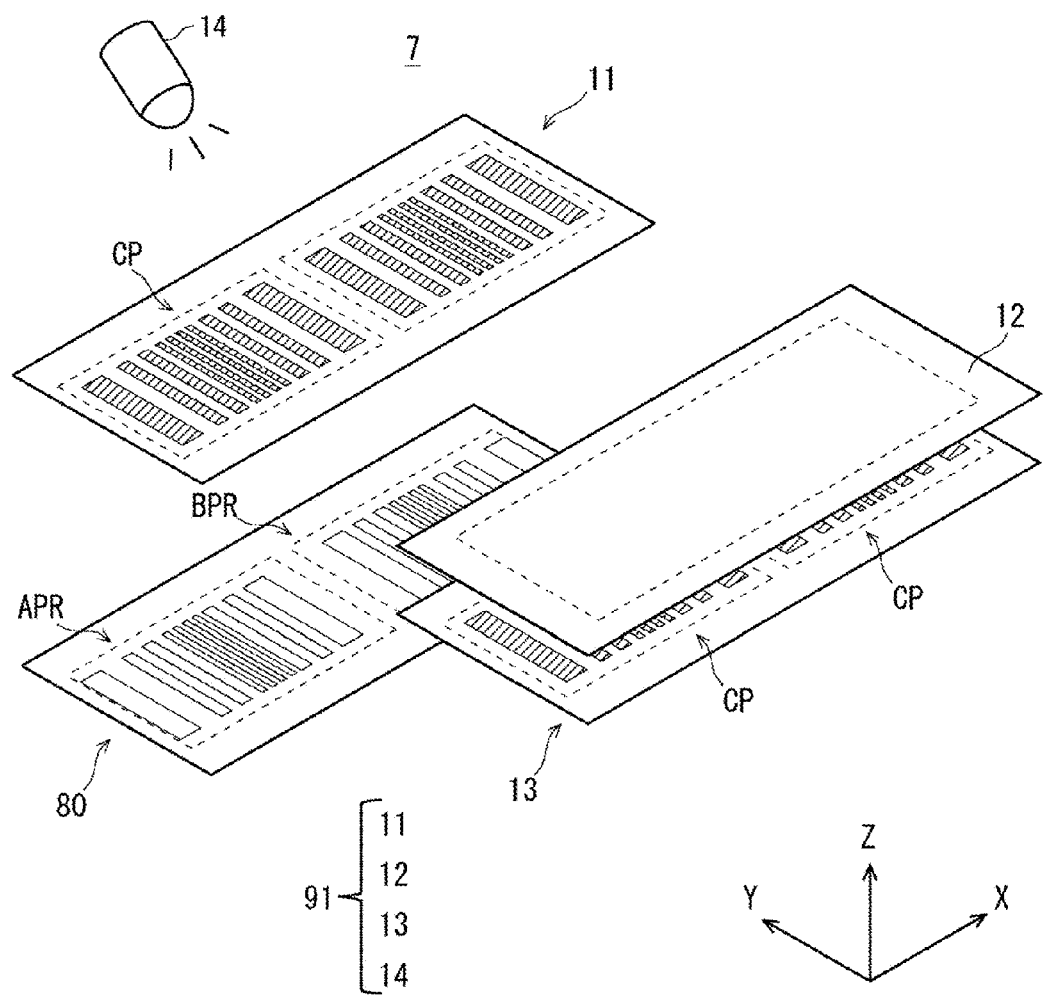
FIG. 28 is a perspective view illustrating a configuration of an optical encoder according to an eighth embodiment.
Figure 29:
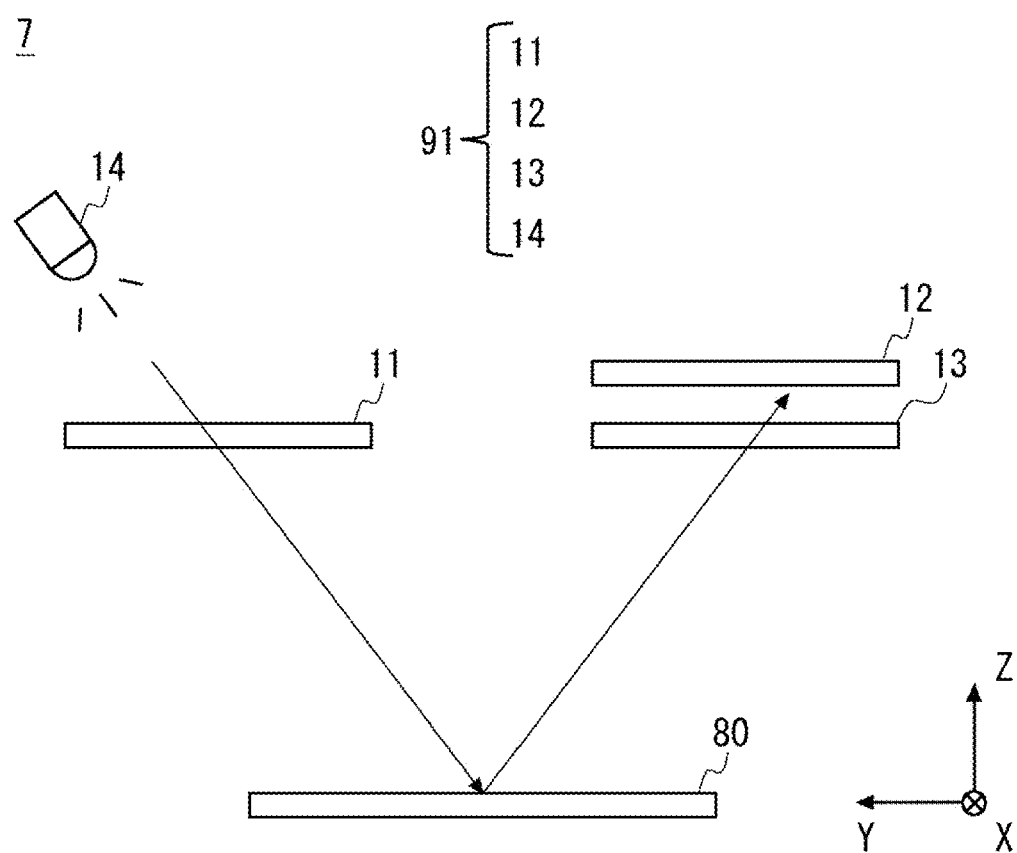
FIG. 29 is a side view illustrating a configuration of the optical encoder according to the eighth embodiment.

The optical encoder according to the present invention may also be a reflection-type encoder. FIG. 28 is a perspective view illustrating a configuration of an optical encoder 7 according to the present embodiment. FIG. 29 is a side view of the optical encoder 7 according to the present embodiment, as viewed from a negative X axis direction toward a positive X axis direction. As shown in FIGS. 28 and 29, an origin point detection scale 80 is a modification of the origin point detection scale 10 according to the first embodiment into a reflection type. In other words, the optical encoder 7 has had the origin point detection scale 10 of the optical encoder 1 swapped out for the origin point detection scale 80, and has had the detection head 9 swapped out for a detection head 91.

The detection head 91 includes the light source 14, the light source grid 11, the photoreceiver element 12, and the photoreceiver grid 13. In the detection head 9 of the first embodiment, the origin point detection scale 10 is positioned between the light source grid 11 and the photoreceiver grid 13. In contrast, in the detection head 91 according to the present embodiment, the light source grid 11 and the photoreceiver grid 13 are arranged on the same side of the origin point detection scale 80. Furthermore, the light source 14 is arranged on an opposite side of the origin point detection scale 80, with the light source grid 11 arranged between the light source 14 and the origin point detection scale 80. The photoreceiver element 12 is arranged on the opposite side of the origin point detection scale 80, with the photoreceiver grid 13 arranged between the photoreceiver element 12 and the origin point detection scale 80, and a photoreception surface of the photoreceiver element 12 faces toward the origin point detection scale 80 (negative Z axis direction).

Light emitted from the light source 14 passes through the light source grid 11 and strikes the origin point detection scale 80. The light which strikes the origin point detection scale 80 is reflected off the origin point detection scale 80, after which the light passes through the photoreceiver grid 13 and strikes the photoreceiver element 12. The light which strikes the photoreceiver element 12 is converted into an electrical signal, and the signal is detected.

The origin point detection scale 80 is provided so as to be aligned with the main signal scale 8 and is a scale generating the origin point signal. The origin point detection scale 80 includes an A pattern APR (origin point detection pattern) and a B pattern BPR (inverse origin point detection pattern). The A pattern APR and B pattern BPR are arranged so as to be aligned in the length measurement direction.

The A pattern APR has the light transmissive portions of the A pattern AP according to the first embodiment (represented by cross-hatching in FIG. 3) swapped out for light reflecting portions, and the non-transmissive portions swapped out for non-reflecting portions. The B pattern BPR has the light transmissive portions of the B pattern BP according to the first embodiment (shown in FIG. 4) swapped out for light reflecting portions, and the non-transmissive portions swapped out for non-reflecting portions. A thin film having high reflectivity (for example, a metal thin film) is formed on the light reflecting portions using vapor deposition or the like. Examples of the metal thin film can include gold, silver, aluminum, chrome, or metal silicide. The metal thin film may be provided in one or a plurality of laminated layers. Moreover, the light reflecting portion is not limited to a metal thin film, and may also be a non-metallic thin film. In this case, the light reflecting portions act as light emission portions emitting light, and the non-reflecting portions act as light blocking portions blocking light.

By swapping out the light transmissive portions of the origin point detection scale 10 according to the first embodiment for the light reflecting portions to achieve the origin point detection scale 80, the optical encoder 7 can detect an origin point signal similarly to the optical encoder 1.

Moreover, the present invention is not limited to the embodiments described above, and may be modified as needed without departing from the scope of the present invention. The optical encoder according to the present invention is not limited to application to a linear encoder, and may also be applied to a rotary encoder.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An optical encoder comprising:
   an origin point detection scale having an origin point detection pattern and an inverse origin point detection pattern that is the inverse of the origin point detection pattern;
   a light source configured to emit light toward the origin point detection scale; a light source grid inserted on the light source side of the origin point detection scale, the light source grid having a first light source grid pattern corresponding to each of the origin point detection pattern and the inverse origin point detection pattern;
   a photoreceiver configured to detect light from the origin point detection scale; and
   a photoreceiver grid inserted on the photoreceiver side of the origin point detection scale, the photoreceiver grid having a first photoreceiver grid pattern that is one of a pattern identical to the first light source grid pattern and a pattern that is the inverse of the first light source grid pattern, the first photoreceiver grid pattern also corresponding to the origin point detection pattern and the inverse origin point detection pattern, wherein:
   each of the origin point detection pattern, the inverse origin point detection pattern, the first light source grid pattern, and the first photoreceiver grid pattern comprise:
     a reference grid pattern in which a light emission portion and a light blocking portion are repeatedly formed at a pitch P in a length measurement direction; and
     a plurality of grid patterns in which the light emission portion and the light blocking portion are repeatedly formed at a pitch P that is $2^n \times P$ in the length measurement direction,
   in the origin point detection pattern, the inverse origin point detection pattern, the first light source grid pattern, and the first photoreceiver grid pattern, the plurality of grid patterns provided at identical positions with respect to the reference grid pattern have equal pitch,
   in one of the origin point detection pattern and the first light source grid pattern, a boundary between the light emission portion and the light blocking portion is provided at a length measurement direction center of the reference grid pattern and the plurality of grid patterns, and
   in the other of the origin point detection pattern and the first light source grid pattern, the light emission portion and the light blocking portion are arranged such that a center of one of the light emission portion and the light blocking portion is positioned at the length measurement direction center of the reference grid pattern and plurality of grid patterns.

2. The optical encoder according to claim 1, wherein, in the origin point detection pattern and the inverse origin point detection pattern, the light emission portion is a light transmissive portion and the light blocking portion is a non-transmissive portion.

3. The optical encoder according to claim 1, wherein, in the origin point detection pattern and the inverse origin point detection pattern, the light emission portion is a light reflecting portion and the light blocking portion is a non-reflecting portion.

4. The optical encoder according to claim 1, wherein, in one of the origin point detection pattern and the first light source grid pattern, the light emission portions and the light blocking portions are arranged symmetrically in the length measurement direction with reference to the length measurement direction center of the reference grid pattern and plurality of grid patterns.

5. The optical encoder according to claim 1, wherein, the photoreceiver grid comprises:
the first photoreceiver grid pattern; and
a second photoreceiver grid pattern arranged on a plane parallel to a plane of the first photoreceiver grid pattern, the second photoreceiver grid pattern having the light emission portions and light blocking portions in an inverse arrangement with respect to the first photoreceiver grid pattern,
groups are formed in which the first photoreceiver grid pattern and the second photoreceiver grid pattern are arranged so as to be perpendicular to the length measurement direction and aligned in a first direction that is parallel to the plane of the first photoreceiver grid pattern, and
the photoreceiver is a photoreceiver element array that includes a plurality of first photoreceiver elements having a length equal to a first direction length of the first photoreceiver grid pattern and a plurality of second photoreceiver elements having a length equal to the first direction length of the second photoreceiver grid pattern, the photoreceiver element array having a group where the first photoreceiver elements and the second photoreceiver elements are aligned in the first direction arranged so as to be aligned in the first direction in the same number as the number of groups of the first photoreceiver grid pattern and the second photoreceiver grid pattern.

6. The optical encoder according to claim 5, wherein, in the photoreceiver grid, at least two groups are arranged so as to be aligned in the first direction, the groups having the first photoreceiver grid pattern and the second photoreceiver grid pattern arranged so as to be aligned in the first direction.

7. The optical encoder according to claim 1, wherein, in the origin point detection scale, a group is formed in which the origin point detection pattern and the inverse origin point detection pattern are arranged perpendicular to the length measurement direction and aligned in the first direction, which is parallel to the plane of the first photoreceiver grid pattern.

8. The optical encoder according to claim 5, wherein, in the origin point detection scale, a group is formed in which the origin point detection pattern and the inverse origin point detection pattern are arranged aligned in the first direction.

9. The optical encoder according to claim 7, wherein, in the origin point detection scale, at least two groups are arranged so as to be aligned in the first direction, the groups having the first photoreceiver grid pattern and the second photoreceiver grid pattern arranged so as to be aligned in the first direction.

10. The optical encoder according to claim 1, wherein:
the optical encoder includes a first origin point detection scale and a second origin point detection scale as the origin point detection scale, the first origin point detection scale and the second origin point detection scale having the origin point detection pattern and the inverse origin point detection pattern, respectively,
the photoreceiver grid includes a first photoreceiver grid corresponding to the first origin point detection scale and a second photoreceiver grid corresponding to the second origin point detection scale,
the first photoreceiver grid has the first photoreceiver grid pattern,
the second photoreceiver grid has a second photoreceiver grid pattern, in which the light emission portions and the light blocking portions are in an inverse arrangement with respect to the first photoreceiver grid pattern, and
the photoreceiver includes a first photoreceiver element receiving light emitted from the first origin point detection scale and the first photoreceiver grid, and a second photoreceiver element receiving light emitted from the second origin point detection scale and the second photoreceiver grid.

11. The optical encoder according to claim 1, wherein:
the photoreceiver includes a plurality of photoreceiver elements arranged so as to form the photoreceiver grid corresponding to the light source grid, and
the plurality of photoreceiver elements are arranged in positions where the light emission portions of the photoreceiver grid are arranged.

12. The optical encoder according to claim 1, wherein:
the origin point detection scale has a plurality of origin point detection patterns, and the pitch of the reference grid pattern of each of the plurality of origin point detection patterns differs.

13. The optical encoder according to claim 12, wherein:
the plurality of origin point detection patterns are provided aligned in the length measurement direction, and
when the smallest pitch of the reference grid pattern of the plurality of origin point detection patterns is designated $P_1$, an integer of at least 1 is designated n, and a constant is designated a, a pitch $P_n$ of a reference grid pattern having a large pitch at the nth instance is expressed by $P_n = P_1 + (n-1) \times a$.

14. The optical encoder according to claim 13, wherein, in the origin point detection scale, an integer of at least 1 is designated k, and the constant a is expressed by $a = P_n/3k$.

15. The optical encoder according to claim 12, wherein:
the plurality of origin point detection patterns are provided aligned in the length measurement direction, and
when the smallest pitch of the reference grid pattern of the plurality of origin point detection patterns is designated $P_1$, an integer of at least 1 is designated n, and a constant is designated b, a pitch $P_n$ of a reference grid pattern having a large pitch at the nth instance is expressed by $P_n = P_1 \times b^{n-1}$.

16. The optical encoder according to claim 1, wherein, the origin point detection scale is provided aligned with a scale generating a main signal.

17. An optical encoder comprising:
an origin point detection scale having an origin point detection pattern and an inverse origin point detection pattern that is the inverse of the origin point detection pattern;
a light source configured to emit light toward the origin point detection scale;
a light source grid inserted on the light source side of the origin point detection scale, the light source grid having a first light source grid pattern corresponding to the origin point detection pattern and the inverse origin point detection pattern;
a photoreceiver configured to detect light from the origin point detection scale; and
a photoreceiver grid inserted on the photoreceiver side of the origin point detection scale, the photoreceiver grid having a first photoreceiver grid pattern that is one of a pattern identical to the first light source grid pattern and a pattern that is the inverse of the first light source grid pattern, the first photoreceiver grid pattern also corresponding to the origin point detection pattern and the inverse origin point detection pattern, wherein:

each of the origin point detection pattern, the inverse origin point detection pattern, the first light source grid pattern, and the first photoreceiver grid pattern comprise:
- a reference grid pattern in which a light emission portion and a light blocking portion are repeatedly formed at a pitch P in a length measurement direction; and
- a plurality of grid patterns in which the light emission portion and the light blocking portion are repeatedly formed at a pitch P that is $2^n \times P$ in the length measurement direction, in the origin point detection pattern, the inverse origin point detection pattern, the first light source grid pattern, and the first photoreceiver grid pattern, the plurality of grid patterns provided at identical positions with respect to the reference grid pattern have equal pitch, in one of the origin point detection pattern and the first light source grid pattern, a boundary between the light emission portion and the light blocking portion is positioned at a length measurement direction center of the reference grid pattern and plurality of grid patterns, in the other of the origin point detection pattern and the first light source grid pattern, the light emission portions and the light blocking portions are arranged such that a center of one of the light emission portion and the light blocking portion is positioned at the length measurement direction center of the reference grid pattern and plurality of grid patterns, in the origin point detection scale, at least two groups are arranged so as to be aligned in a first direction, which is parallel to a plane of the first photoreceiver grid pattern, the groups having the origin point detection pattern and the inverse origin point detection pattern arranged perpendicular to the length measurement direction of the scale and aligned in the first direction, and the photoreceiver includes a first photoreceiver element array in which a plurality of photoreceiver elements having the same shape as the light emission portion of the first light source grid pattern are arranged in positions corresponding to the light emission portions of the first light source grid pattern, and a second photoreceiver element array in which a plurality of photoreceiver elements having the same shape as the light blocking portion of the first light source grid pattern are arranged in positions corresponding to the light blocking portions of the first light source grid pattern.

* * * * *